(12) United States Patent
Tomiyama et al.

(10) Patent No.: US 6,571,929 B2
(45) Date of Patent: Jun. 3, 2003

(54) TORQUE CONVERTER WITH LOCKUP DEVICE

(75) Inventors: Naoki Tomiyama, Osaka (JP); Shinji Fujimoto, Osaka (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/855,537

(22) Filed: May 16, 2001

(65) Prior Publication Data

US 2001/0052443 A1 Dec. 20, 2001

(30) Foreign Application Priority Data

| May 26, 2000 | (JP) | ................................. | 2000-155613 |
| Aug. 31, 2000 | (JP) | ................................. | 2000-262583 |
| Sep. 13, 2000 | (JP) | ................................. | 2000-277645 |

(51) Int. Cl.$^7$ ............................................. F16H 45/02
(52) U.S. Cl. ................................ 192/213.1; 192/213.2; 192/3.29
(58) Field of Search ...................... 192/212, 213.1, 192/213.2, 3.29, 3.28

(56) References Cited

U.S. PATENT DOCUMENTS

| 4,138,003 A | * | 2/1979 | Malloy | ........................ | 192/3.29 |
| 5,246,399 A | * | 9/1993 | Yanko et al. | ................. | 464/63 |
| 5,713,442 A | * | 2/1998 | Murata et al. | ............. | 192/3.29 |
| 5,813,506 A | * | 9/1998 | Maeda et al. | .............. | 192/3.29 |
| 6,050,376 A | * | 4/2000 | Yabe | ......................... | 192/3.29 |

FOREIGN PATENT DOCUMENTS

| JP | 8-285038 A | 11/1996 |
| JP | 8-338475 A | 12/1996 |
| JP | 11-141617 A | 5/1998 |

* cited by examiner

Primary Examiner—Saúl Rodriguez
(74) Attorney, Agent, or Firm—Shinjyu Global IP Counselors, LLP

(57) ABSTRACT

A torque converter is provided with a lockup device that functions as a clutch and as an elastic coupling mechanism. In one embodiment, the lockup device is configured to eliminate an outer cylindrical portion from its piston. Preferably, a spring holder has an outer portion arranged radially outside the torsion springs, while a drive plate has a cylindrical portion restricting radial movement of the spring holder. In other embodiments, the elastic coupling mechanism is configured with a sufficient number of sets of elastic members that act together in the rotational direction as if they were arranged end to end. The elastic coupling mechanism has one set of springs disposed radially inward of another set of springs. A spring holder connects first and second sets of springs such that the first and second sets of springs act together in the rotational direction as if they were arranged end to end.

70 Claims, 16 Drawing Sheets

TORQUE CONVERTER WITH LOCKUP DEVICE

BACKGROUND OF THE INVENTION

1. Field of the Invention

This invention generally relates to a lockup device for a torque converter. More specifically, the present invention relates to a lockup device having an elastic coupling mechanism.

2. Background Information

Torque converters usually include a fluid coupling mechanism for transmitting torque between the crankshaft of an engine and the input shaft of an automatic transmission. A torque converter has three types of bladed wheels (impeller, turbine, stator) located inside for transmitting the torque by means of an internal hydraulic oil or fluid. The impeller is fixedly coupled to the front cover that receives the input torque from the crankshaft of an engine. The hydraulic chamber formed by the impeller shell and the front cover is filled with hydraulic oil. The turbine is disposed opposite the front cover in the hydraulic chamber. When the front cover and the impeller rotate together, the hydraulic oil flows from the impeller to the turbine, and the turbine rotates. As a result, the torque is transmitted from the turbine to the main drive shaft of the transmission.

Generally, a torque converter can perform smooth acceleration and deceleration because it transmits a power via fluid. However, an energy loss occurs due to slip of the fluid, resulting in low fuel consumption. Accordingly, in recent years to improve fuel efficiency, some of the conventional torque converters have included a lockup device for mechanically coupling a front cover on an input side and a turbine on an output side. Specifically, the lockup device is disposed in a space located axially between the front cover and the turbine. When the torque converter reaches predetermined operating conditions, the lockup device of the torque converter causes power from the crankshaft of the engine to be directly transmitted to the automatic transmission, and thus, bypassing the fluid coupling device.

Usually, such lockup devices typically include a damper mechanism or an elastic coupling mechanism having a retaining plate, torsion springs and a driven member. In general, a damper mechanism or elastic coupling mechanism transmits torque from the input rotating member to the output rotating member while absorbing and dampening torsional vibrations imparted to the output rotating member from the input rotating member.

Normally the lockup device has a disc-shaped piston, a retaining plate, at least one torsion spring, and a driven plate or member. The piston can be pressed against the front cover. The retaining plate is secured to an outer peripheral section of the piston. The torsion springs are supported by the retaining plate in a rotational direction and at the outer peripheral side of the retaining plate. The driven member supports the opposing ends of each torsion spring in a rotational direction. The driven member is fixedly coupled to a turbine shell or a turbine hub of the turbine.

When the lockup device is engaged, the torque is transmitted from the front cover to the piston and imparted to the turbine via the torsion springs. Furthermore, as the torque fluctuations are transmitted from an engine to the lockup device, the torsion springs are compressed between the retaining plate and the driven member in the damper mechanism, such that torsional vibrations are absorbed and dampened. In other words, the damper mechanism functions as a torsional vibration dampening mechanism to dampen vibration in the lockup device.

The piston is disposed to divide the space between the front cover and the turbine into a first hydraulic chamber on the front cover side and a second hydraulic chamber on the turbine side. As a result, the piston can move axially close to and away from the front cover due to the pressure difference between the first hydraulic chamber and the second hydraulic chamber. When the hydraulic oil in the first hydraulic chamber is drained and the hydraulic pressure in the second hydraulic chamber increases in pressure, the piston moves toward the front cover side. This movement of the piston causes the piston to strongly press against the front cover.

In the conventional lockup device, the operation of the piston is controlled by the working fluid flowing through the main unit of the torque converter. More specifically, a hydraulic operation mechanism in an external position supplies the working fluid to a space between the piston and the front cover when the lockup device is disengaged. This working fluid flows radially outward through the space between the front cover and the piston, and then flows from its radially outer portion into the main unit of the torque converter. When the lockup device is engaged, the working fluid in the space between the front cover and the piston is drained from its radially inner portion so that the piston moves toward the front cover. Thereby, the friction member arranged on the piston is pressed against the friction surface of the front cover. In this manner, the torque of the front cover is transmitted to the turbine via the lockup device.

Preferably, the lockup device uses a plurality of torsion spring sets that act in series in the rotational direction in order to achieve low rigidity and a wide torsional angle. Each spring set constitutes, for example, a pair of coil springs. An intermediate float body (floating element) is disposed between the pair of coil springs in the rotational direction and connects the pair of coil springs together. The intermediate float body constitutes, for example, a ring-shaped part and a claw that extends from the ring-shaped part to the space between the pair of coil springs. With the lockup device just described, the number of spring sets is limited because the spring sets are arranged on the same circle. Therefore, the twisting torque cannot be increased beyond a certain level.

The piston carries an annular friction member adhered to a position opposed to a flat friction surface of the front cover. This portion of the piston and the friction surface of the front cover form a clutch coupling portion of the lockup device. When a clutch coupling portion of the lockup device operates, the torque is transmitted from the front cover to the piston. Thus, the torque transmitted is further transmitted from the retaining plate to the driven plate via the coil springs, and then to the turbine. Torsional vibrations transmitted from the front cover are absorbed and dampened by the coil springs that are compressed between the retaining plate and the driven plate.

In the lockup device described above, the piston is provided at its outer periphery with an outer cylindrical portion so that the cylindrical portion can bear the load applied by the torsion springs, which are forced radially outward by a centrifugal force. However, this structure suffers from such problems that the outer cylindrical portion increases the weight of the piston, and an annular frictional coupling portion has an excessively high rigidity.

In view of the above, there exists a need for a lockup device for a torque converter which overcomes the above mentioned problems in the prior art. This invention addresses this need in the prior art as well as other needs, which will become apparent to those skilled in the art from this disclosure.

SUMMARY OF THE INVENTION

An object of the invention is to provide a lockup device of a torque converter having a disk-like piston, from which a conventional outer cylindrical portion can be eliminated.

Another object of the present invention is to provide an elastic coupling mechanism for a torque converter lockup device or the like having a sufficient number of sets of elastic members that are arranged so as to act as if the elastic members were arranged end to end in the rotating direction.

According to an aspect of the present invention, a lockup device of a torque converter is provided for transmitting a torque and operating to absorb and dampen torsional vibrations. The lockup device includes a disk-like piston, an output rotary member, an elastic member, a support member and a restricting portion. The disk-like piston is a member for performing a clutch operation. The elastic member is a member for elastically coupling the piston and the output rotary member in a rotating direction. The support member has an outer support portion arranged radially outside the elastic member. The support member is arranged relatively rotatably with respect to the piston and the output rotary member. The restricting portion restricts radial movement of the support member. According to this lockup device, the support member, of which radially outward movement is restricted by the restricting portion, supports the radially outer side of the elastic member by its outer support portion. In this manner, the support member restricts the radially outward movement of the elastic member so that an outer cylindrical portion of the disk-like piston can be eliminated.

According to a second aspect of the present invention, the lockup device of the torque converter of the first aspect of the present invention further has such a feature that the support member further has an inner support portion arranged on the radially inner side of the elastic member. The restricting portion is in contact with the inner support portion, and radially supports the support member.

According to a third aspect of the present invention, the lockup device of the torque converter has such a feature that the restricting portion has an outer peripheral surface in contact with the inner peripheral surface of the inner support portion.

According to a fourth aspect of the present invention, the lockup device of the torque converter of the first aspect of the present invention further has such a feature that the support member further has an axial support portion extending radially inward from the outer support portion for supporting one of axially opposite sides of the elastic member. The restricting portion is in contact with the axial support portion for radially supporting the support member.

According to a fifth aspect of the present invention, the lockup device of the torque converter of any one of the first to fourth aspects of the present invention further has such a feature that the elastic member is formed of a pair of members arranged for compression together in the rotating direction. The support member further has a torque transmitting portion arranged in a space defined in the rotating direction between the paired elastic members. In this lockup device, the support member functions as an intermediate float member with respect to the paired elastic members, and a simple structure can be employed for eliminating an outer cylindrical portion from the piston.

According to a sixth aspect of the present invention, the elastic coupling mechanism is provided with a first elastic member, a second elastic member, a first rotating member, a second rotating member, and an intermediate member. The second elastic member is disposed further inward in the radial direction than the first elastic member. The first rotating member has a first abutting part that abuts against both rotationally facing ends of the first elastic member. The second rotating member has a second abutting part that abuts against both rotationally facing ends of the second elastic member. The intermediate member connects the first and second elastic members such that they act as if they were arranged end to end in the rotating direction. With this mechanism, the first elastic member and second elastic member, which compress together in the rotational direction, are aligned not in the rotational direction but in the radial direction. Therefore, a high twisting torque can be established by increasing the number of spring sets or the like.

According to a seventh aspect of the present invention, the intermediate member of the elastic coupling mechanism of the sixth aspect of the present invention includes: a third abutting part that abuts against both rotationally facing ends of the first elastic member; a fourth abutting part that abuts against both rotationally facing ends of the second elastic member; and a connecting part that connects the third abutting part and the fourth abutting part.

According to a eighth aspect of the present invention, the intermediate member of the elastic coupling mechanism of the seventh aspect of the present invention is provided with an intermediate support part that extends in the radial direction between the first elastic member and the second elastic member.

According to a ninth aspect of the present invention, the connecting part of the elastic coupling mechanism of the eighth aspect of the present invention is provided with a first support part that supports the radially facing outside portion of the first elastic member and a second support part that supports the radially facing inside portion of the second elastic member.

According to a tenth aspect of the present invention, the intermediate member of the elastic coupling mechanism of the sixth aspect of the present invention is provided with a first window part that houses the first elastic member and a second window part that houses the second elastic member.

According to a eleventh aspect of the present invention, the elastic coupling mechanism of the tenth aspect of the present invention includes: a plurality of first elastic members, a plurality of second elastic members, a first rotating member, a second rotating member, and an intermediate member. The first elastic members are aligned in the circumferential direction. The second elastic members are aligned in the circumferential direction and disposed further inward in the radial direction than the first elastic members. The first rotating member has first abutting parts that abut against both rotationally facing ends of the first elastic members. The second rotating member has second abutting parts that abut against both rotationally facing ends of the second elastic members. The intermediate member is a disc-shaped member, is formed with a plurality of window parts that house the first and second elastic members, and connects the first and second elastic members such that they act as if the first and second elastic members were arranged end to end in the rotating direction.

With this mechanism, the first elastic member and second elastic member, which act as if the first and second elastic members were arranged end to end in the rotating direction in the rotational direction, are aligned not in the rotational direction but in the radial direction. Therefore, a high twisting torque can be established by increasing the number of spring sets or the like. More particularly, the structure of this mechanism is simple because the intermediate member is a disc-shaped member in which several windows have been formed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

FIRST EMBODIMENT

Figure 1:
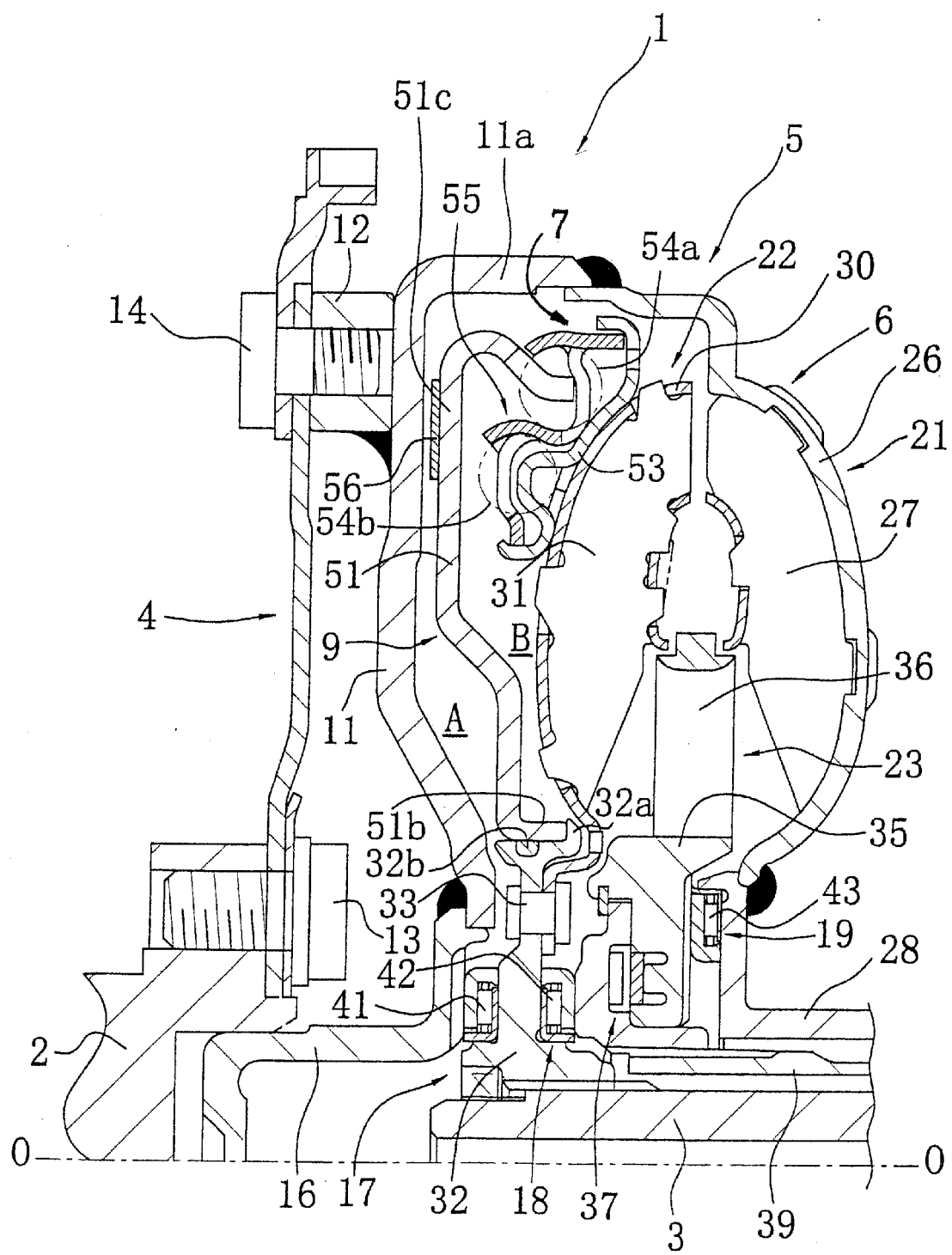
FIG. 1 is a partial schematic vertical cross sectional view of a torque converter in accordance with a first embodiment of the present invention.
Figure 2:
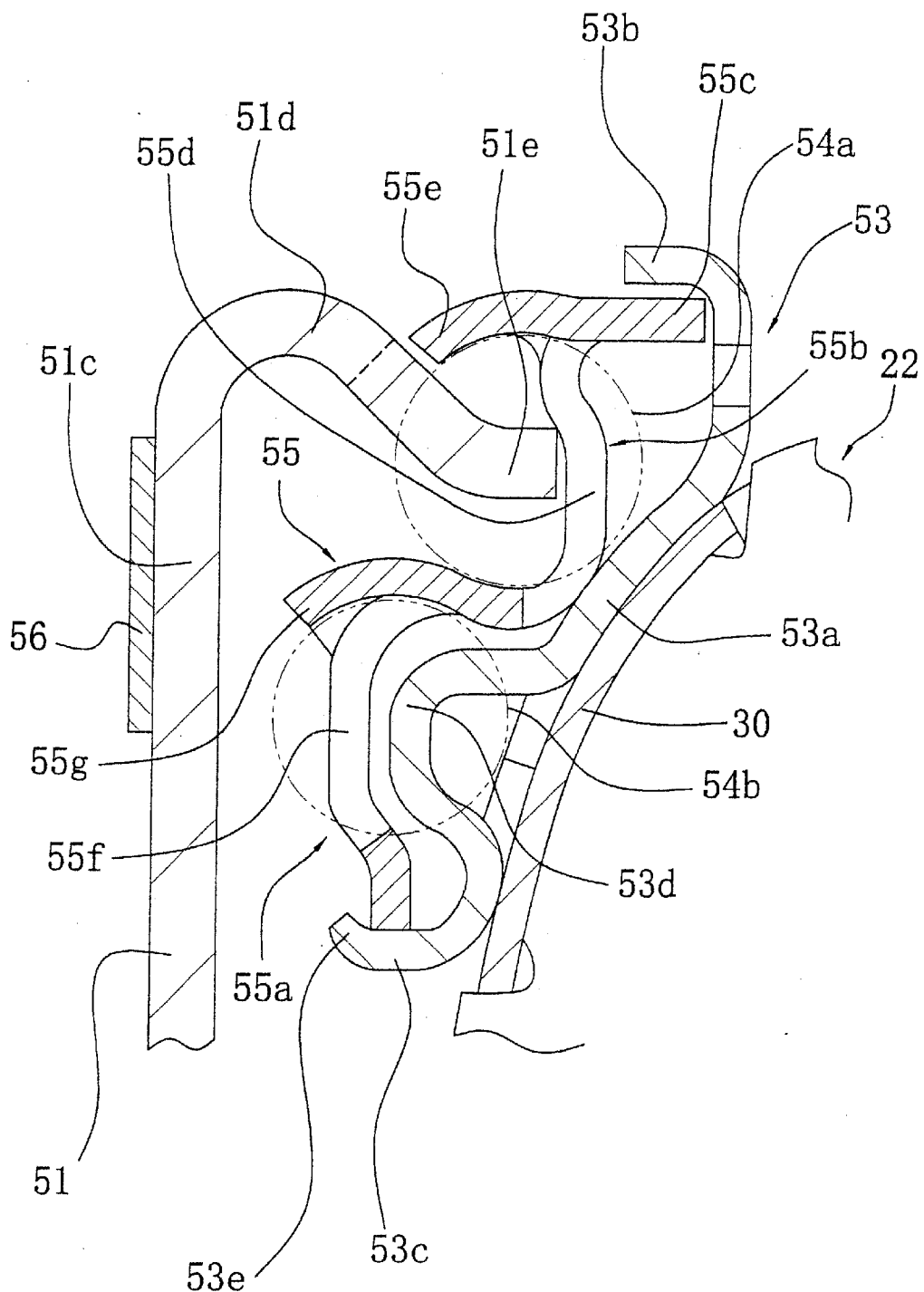
FIG. 2 is an enlarged partial cross sectional view of the torque converter illustrated in FIG. 1.
Figure 3:
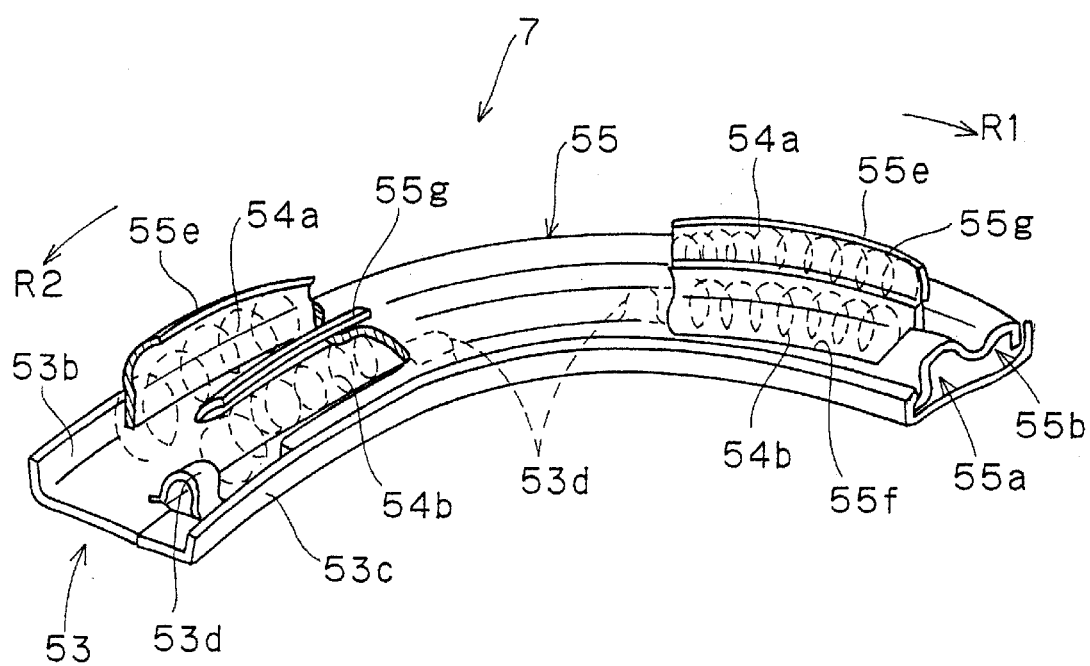
FIG. 3 is a partial perspective view of an elastic coupling mechanism of the lockup device for the torque converter illustrated in FIG. 1.

Referring initially to FIGS. 1–5, a torque converter 1 is illustrated to explain the basic structure of a first embodiment of the present invention. FIG. 1 is a partial schematic vertical cross sectional view of the torque converter 1 in accordance with a first embodiment of the present invention. The torque converter 1 serves to transmit torque from the crankshaft 2 of an engine to the input shaft 3 of a transmission. The engine (not shown) is disposed to the left of FIG. 1 and the transmission (not shown) is disposed to the right of FIG. 1. The rotational axis of the torque converter 1 is represented by the center line O—O as seen in FIG. 1. In FIG. 3, the arrow R1 indicates the rotational drive direction of the torque converter 1, while the arrow R2 indicates the opposite direction.

The torque converter 1 basically comprises a flexible plate 4 and a torque converter main body 5. The flexible plate 4 comprises a thin disc-shaped member that serves to transmit torque while absorbing the bending vibrations transmitted from a crankshaft 2 to the torque converter main body 5. Therefore, the flexible plate 4 has sufficient rigidity for transmitting torque in the rotational direction but has low rigidity in the bending direction.

The torque converter main body 5 comprises a torus-shaped fluid operating chamber 6, which includes a lockup device 7 and three types of bladed wheels, e.g., an impeller 21, a turbine 22, and a stator 23.

The front cover ii is a disc-shaped member disposed close to the flexible plate 4. A center boss 16 is fixed by welding to the inner circumferential edge of the front cover 11. The center boss 16 is a cylindrical member that extends in the axial direction and is inserted into a center cavity in the crankshaft 2.

The inner circumferential part of the flexible plate 4 is fixedly coupled to the end face of the crankshaft 2 by a plurality of bolts 13. The outer circumferential portion of the front cover 11 that faces the engine has a plurality of nuts 12 fixed thereto. The nuts 12 are preferably fixed to the front cover 11 along an imaginary circle at equal spacings in the circumferential direction. The outer circumferential portion of the flexible plate 4 is fixedly coupled to the front cover 11 by the bolts 14, which screw into the nuts 12.

An outer cylindrical part 11a that extends toward the transmission in the axial direction is formed on the outer circumferential portion of the front cover 11. The outer circumferential edge of the impeller shell 26 of the impeller 21 is fixed by welding to the tip of the outer cylindrical part 11a. As a result, a fluid chamber filled inside with operating fluid is formed between the front cover 11 and the impeller 21. The impeller 21 basically comprises an impeller shell 26, a plurality of impeller blades 27 and an impeller hub 28. The impeller blades 27 are fixedly coupled to the inside of the impeller shell 26, while the impeller hub 28 is fixedly coupled to the inner circumferential portion of the impeller shell 26.

The turbine 22 is disposed inside the fluid chamber such that it faces the impeller 21 in the axial direction. The turbine 22 basically comprises a turbine shell 30, a plurality of turbine blades 31 and a turbine hub 32. The turbine blades 31 are fixedly coupled to the surface of the turbine shell 30 that faces the impeller 21, while the turbine hub 32 is fixedly coupled to the inner circumferential edge of the turbine shell 30. The turbine shell 30 and the turbine hub 32 are fixed together with a plurality of rivets 33. The inner circumferential surface of the turbine hub 32 is provided with a plurality of splines for engaging with the input shaft 3. Thus, the turbine hub 32 rotates integrally with the input shaft 3.

The stator 23 is a mechanism that serves to redirect the flow of the operating fluid returning to the impeller 21 from the turbine 22. The stator 23 is a single unit made of cast resin or aluminum alloy. The stator 23 is disposed between the inner circumferential portion of the impeller 21 and the inner circumferential portion of the turbine 22. The stator 23 basically comprises a ring-shaped stator shell 35 and a plurality of stator blades 36 provided on the outer circumferential surface of the shell 35. The stator shell 35 is supported by a cylindrical stationary shaft 39 with a one-way clutch 37 disposed therebetween. The stationary shaft 39 extends between the outer circumferential surface of the input shaft 3 and the inner circumferential surface of the impeller hub 28.

The bladed wheels 21, 22 and 23 and the shells 26, 30 and 35 form a torus-shaped fluid operating chamber 6 inside the fluid chamber. Also, a ring-shaped space 9 is secured inside the fluid chamber between the fluid operating chamber 6 and the front cover 11. The one-way clutch 37 is operatively coupled to the stator 23. While the one-way clutch 37 is shown in the figure as a ratchet structure, it will be apparent to those skilled in the art that a roller or sprag structure can also be used instead.

A first thrust bearing 41 is disposed axially-between the inner circumferential part of the front cover 11 and the turbine hub 32. In the section where the first thrust bearing 41 is provided, a first port 17 is formed which allows operating fluid to communicate in the radial direction. The first port 17 links the fluid passage provided inside the input shaft 3, the first hydraulic chamber A (discussed later) and the space between the turbine 22 and the front cover 11. Meanwhile, a second thrust bearing 42 is disposed between the turbine hub 32 and the inner circumferential portion of the stator 23 (i.e., one-way clutch 37). In the section where the second thrust bearing 42 is provided, a second port 18 is formed which allows operating fluid to communicate in the radial direction between both sides thereof. In short, the second port 18 links the fluid operating chamber 6 with the fluid passage between the input shaft 3 and the stationary shaft 39. There is also a third thrust bearing 43 disposed axially between the stator 23 (i.e., the shell 35) and the impeller 21 (i.e., the impeller hub 28). In the section where the third thrust bearing 43 is provided, a third port 19 is formed which allows operating fluid to communicate in the radial direction between both sides thereof. In short, the third port 19 links the fluid operating chamber 6 with the fluid passage between the stationary shaft 39 and the impeller hub 28. Also, each fluid passage is connected to a hydraulic circuit (not shown) and operating fluid can be supplied and discharged to and from each of the first to third ports 17 to 19 independently.

The lockup device 7 is disposed in the space 9 between the turbine 22 and the front cover 11 and serves to mechanically connect the turbine 22 and the front cover 11 when necessary. The lockup device 7 is generally disc-shaped and divides the space 9 in roughly the axial direction. Here, the space between the front cover 11 and the lockup device 7 is called the first hydraulic chamber A and the space between the lockup device 7 and the turbine 22 is called the second hydraulic chamber B. The lockup device 7 also functions as a clutch and as an elastic coupling mechanism. The lockup device 7 basically comprises a piston 51, a driven member 53, a plurality of torsion springs or elastic elements 54a and 54b, and a spring holder 55. As used herein, the phase "elastic member" can include one or more elastic elements (springs).

The piston 51 serves as a member for executing clutch engagement and disengagement that also serves as an input member when the lockup device 7 functions as an elastic coupling mechanism. The piston 51 is shaped like a disc with a center hole formed therein. The piston 51 extends across the entirety of the space 9 in the radial direction so that the space 9 is divided in roughly the axial direction. The inner cylindrical part 51b is formed on the inner circumferential edge of the piston 51 so as to extend toward the transmission in the axial direction. The inner cylindrical part 51b is supported by the outer circumferential surface of the turbine hub 32 in such a manner that it can move in the rotational direction and the axial direction. A flange 32a is formed on the outer circumferential surface of the turbine hub 32. The flange 32a limits the movement of the piston 51 toward the transmission in the axial direction by abutting against the inner cylindrical part 51b. An annular seal ring 32b that contacts the inner circumferential surface of the inner cylindrical part 51b is provided on the outer circumferential surface of the turbine hub 32. This seal ring 32b forms a seal in the axial direction at the inner circumferential edge of the piston 51. A frictional connecting part 51c is formed toward the outside of the piston 51. The frictional connecting part 51c has a ring-shaped section with a prescribed length in the radial direction. Both axially facing surfaces of the frictional connecting part 51c are planar and contained in planes that are perpendicular to the axial direction. A ring-shaped friction facing 56 is attached to the side of the frictional connecting part 51c that faces toward the engine in the axial direction. Thus, the clutch of the lockup device 7 comprises the piston 51 and the flat friction surface of the front cover 11.

As seen in FIG. 2, a bent portion 51d is formed on the outer circumferential edge of the piston 51. The bent portion 51d is bent toward and extends toward the transmission in the axial direction. The bent portion 51d is formed in a ring shape along the outer circumferential edge of the piston 51. The claws 51e (first abutting parts) that extend inward and also toward the transmission in the axial direction are formed on the bent portion 51d. The claws 51e are plural in number and spaced in the rotational direction.

The driven member 53 serves to transmit the torque from the torsion spring 54 to the turbine 22. The driven member 53 is a ring-shaped member made of sheet metal and provided toward the outside of the turbine shell 30 of the turbine 22. The driven member 53 basically includes a ring-shaped fixing part 53a, an outer cylindrical part 53b, an inner cylindrical part 53c and a plurality of torque transmitting parts 53d (second abutting parts). The ring-shaped fixing part 53a is fixedly coupled to the turbine shell 30. The outer cylindrical part 53b extends toward the engine in the axial direction from the outer circumferential edge thereof. The inner cylindrical part 53c extends toward the engine in the axial direction from the inner circumferential edge of fixing part 53a. The torque transmitting parts 53d (second abutting parts) are formed by drawing such that they protrude toward the engine in the axial direction from fixing part 53a. The torque transmitting parts 53d are plural in number and formed with an equal spacing in the rotational direction.

As best seen in FIGS. 2 and 3, the spring holder 55 is assembled onto the driven member 53. The spring holder 55 is ring-shaped member made of sheet metal that is disposed axially between the driven member 53 and the frictional connecting part 51c of the piston 51. The inner circumferential part 55a of the spring holder 55 has a roughly flat-plate shape. The outer circumferential part 55b of the spring holder 55 has a roughly flat-plate shape and is axially offset with respect to inner circumferential part 55a towards the transmission. In other words, the spring holder 55 follows a shape that curves toward the transmission in the axial direction as one moves toward the axially facing outside of the turbine shell 30. A cylindrical part 55c is provided on the outer circumferential edge of the outer circumferential part 55b. The cylindrical part 55c extends toward the transmission in the axial direction. The inner circumferential surface of the spring holder 55 abuts against the outer circumferential surface of the inner cylindrical part 53c of the driven member 53. The tip 53e of the inner cylindrical part 53c is bent outwardly and supports the spring holder 55 at a portion close to the inner circumferential edge on the side facing toward the engine in the axial direction. This support keeps the spring holder 55 from separating from the driven member 53 in the axial direction toward the engine. The cylindrical part 55c of the spring holder 55 extends on the inside of the outer cylindrical part 53b of the driven member 53. As previously described, the spring holder 55 can move in the rotational direction while being guided by the driven member 53 (i.e., while being engaged so that it cannot move in the radial direction or the axial direction).

The outer circumferential part 55b of the spring holder 55 has a plurality of first window parts 55d that are aligned in the rotational direction along an imaginary outer circle. The first window parts 55d are long notches that extend in the rotational direction. The first support parts 55e are formed toward the outside of the notch portions. The first support parts 55c are bent portions that are formed by cutting and bending flanges from the body of the spring holder 55. The first support parts 55e extend toward the engine in the axial direction from the outer circumferential edge of the first window parts 55d with the tips of the first support parts 55e being bent slightly inward.

Similarly, the inner circumferential part 55a of the spring holder 55 has a plurality of second window parts 55f that are aligned in the rotational direction along an imaginary inner circle. The second window parts 55f are long notches that extend in the rotational direction. The second support parts 55g are formed toward the outside of the notch portions. The second support parts 55g are bent portions that are formed by cutting and bending flanges from the body of the spring holder 55. The second support parts 55g extend toward the engine in the axial direction from the outer circumferential edge of the second window parts 55f with the tips of the second support parts 55g being bent slightly inward.

Figure 4:
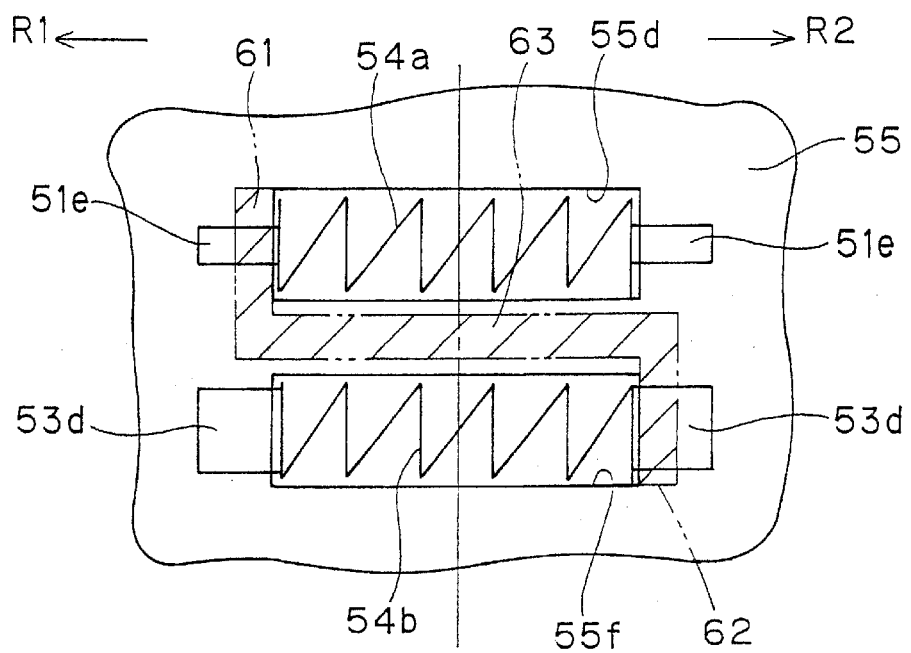
FIG. 4 is a simplified schematic view of a spring set of the elastic coupling mechanism of the lockup device for the torque converter illustrated in FIG. 1.

The second window parts 55f are formed further inward in the radial direction than the first window parts 55d. In other words, the first and second window parts 55d and 55f are positioned so as to coincide in the radial direction as seen in FIGS. 3 and 4. However, the second window parts 55f are slightly shorter in the rotational direction than the first window parts 55d, but the angle formed in the rotational direction by both window parts is roughly the same. In other words, the first and second window parts 55d and 55f have the same arc or angular dimension, but have different lengths since they are concentrically arranged. Also the length of the second window parts 55f in the radial direction is also slightly shorter than that of the first window parts 55d. Preferably, the spring holder 55 has eight of the first window parts 55d and eight of the second window parts 55f.

The torsion springs 54a and 54b are preferably coil springs that extend in the rotational direction. The torsion springs 54a and 54b are housed inside the first and second window parts 55d and 55f, respectively. Preferably, the spring holder 55 has eight of the first torsion springs 54a and eight of the second torsion springs 54b. Preferably, compared to the first torsion springs 54a, the wire diameter and the coil diameter of the second torsion springs 54b are smaller. Thus, the spring constant of the second torsion springs 54b is also smaller than the spring constant of the first torsion springs 54a. It is also acceptable for same type of spring to be used for the first torsion springs 54a and the second torsion springs 54b.

Since the first torsion springs 54a and the second torsion springs 54b are arranged so as to follow the shape of the turbine shell 30, the second torsion springs 54b are positioned more toward the engine in the axial direction than are the first torsion springs 54a. However, since the second torsion springs 54b have a smaller coil diameter, the amount by which they project in the axial direction is suppressed.

In the explanation provided below a pair of radially adjacent torsion springs 54a and 54b arranged in a pair of radially adjacent first and second window parts 55d and 55f will be referred to herein as "one spring set."

Both rotationally facing ends of the first torsion springs 54a are close to or contact the rotationally facing end faces of the first window parts 55d and also close to or contact the claw parts 51e of the piston 51. The first support parts 55e support the outer circumferential side of the first torsion springs 54a as well as the side facing toward the engine in the axial direction. As a result, the first torsion springs 54a do not separate from the spring holder 55 in the axial direction. Both rotationally facing ends of the second torsion springs 54b are close to or in contact with the rotationally facing end faces of the second window parts 55f and also close to or in contact with the torque transmitting parts 53d of the driven member 53. The second support parts 55g support the outer circumferential side of the second torsion springs 54b as well as the side facing toward the engine in the axial direction. As a result, the second torsion springs 54b do not separate from the spring holder 55 in the axial direction.

Thus, the spring holder 55 functions as an intermediate float body (floating element) that connects the first torsion springs 54a and the second torsion springs 54b in the rotational direction. The spring holder 55 also functions as a member for holding the first torsion springs 54a and the second torsion springs 54b toward the turbine. More specifically, the spring holder 55 supports one axially facing side of the torsion springs 54a and 54b by means of first and second support parts 55e and 55g. The spring holder 55 also supports both rotationally facing sides and both radially facing sides of the torsion springs 54a and 54b by means of first and second window parts 55d and 55f. The spring holder 55 also supports the entire outer circumferential part of the torsion springs 54a and 54b with first and second support parts 55e and 55g to reduce the surface pressure caused by contact.

The claw parts 51e can move with respect to the spring holder 55 in the axial direction. That is, the piston 51 can move in the axial direction in response to changes in hydraulic pressure while maintaining its engagement with the torsion springs 54a and 54b.

OPERATION OF TORQUE CONVERTER OF FIG. 1

Immediately after staring the engine, operating fluid is delivered to the inside of the torque converter main body 5 via the first port 17 and the third port 19 and operating fluid is discharged via the second port 18. The operating fluid delivered from the first port 7 flows outward through the first hydraulic chamber A, passes through the second hydraulic chamber B, and flows into the fluid operating chamber 6. Therefore, the piston 51 moves axially toward the engine due to the pressure difference between the first hydraulic chamber A and the second hydraulic chamber B. Thus, the friction facing 56 separates from the front cover 11 and the lockup device 7 is released.

When the lockup device 7 is released in this manner, the torque transmission between the front cover 11 and the turbine 22 is accomplished by the fluid drive between the impeller 21 and the turbine 22.

When the speed ratio of the torque converter 1 increases and the input shaft 3 reaches a prescribed rotational speed, operating fluid is discharged from the first hydraulic chamber A via the first port 17. As a result, the pressure difference between first hydraulic chamber A and the second hydraulic chamber B piston causes the piston 51 to move toward the front cover 11 so that the friction facing 56 is pressed against the flat friction surface of the front cover 11. As a result, the torque of the front cover 11 is transmitted from the piston 51 to the driven member 53 via the torsion springs 54a and 54b. The torque is then transmitted from the driven member 53 to the turbine 22. In short, the front cover 11 is mechanically connected to the turbine 22 and torque is fed directly from the front cover 11 to the input shaft 3 via the turbine 22.

When the lockup condition described here exists, the lockup device 7 transmits torque and also absorbs and dampens the torsional vibrations imparted from the front cover 11. More specifically, when torsional vibrations are imparted to the lockup device 7 from the front cover 11, the torsion springs 54a and 54b are compressed in the rotational direction between the piston 51 and the driven member 53. Still more specifically, the torsion springs 54a and 54b are compressed in the rotational direction between the claw parts 51e of the piston 51 and torque transmitting parts 53d of the driven member 53. When this occurs, a characteristic of low rigidity and a wide torsional angle is obtained because, in each spring set, a pair of the torsion springs 54a and 54b are functionally arranged to compress and expand together as if the torsion springs 54a and 54b were arranged end to end in the rotational direction. Thus, the phrase "serially arranged" as used herein to describe the function of two or more springs refers to two or more springs that compress and expand together in the rotational direction as if the springs were arranged end to end.

Figure 5:
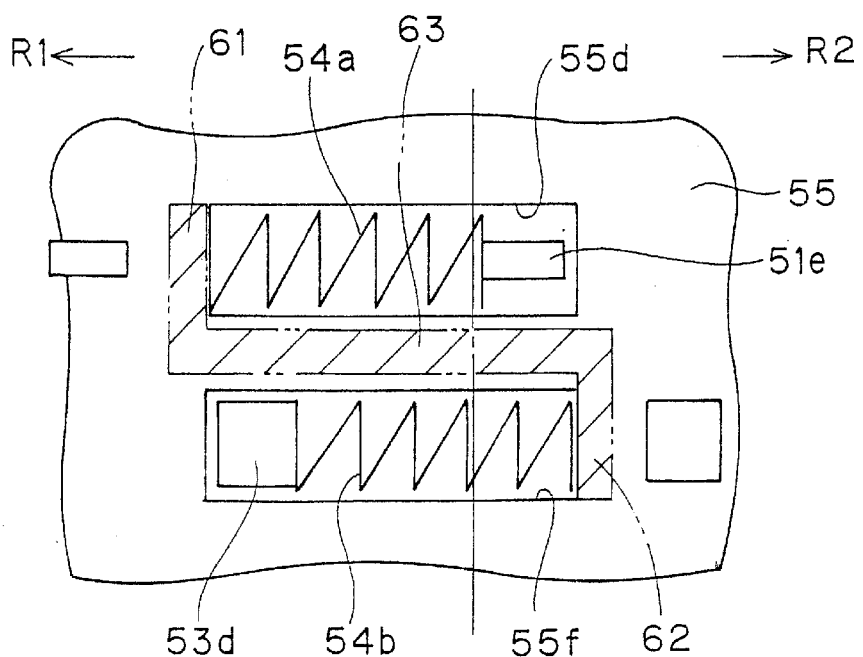
FIG. 5 is a simplified view is a simplified schematic view of the spring set of the elastic coupling mechanism of the lockup device for the torque converter illustrated in FIG. 1 for explaining the torsional operation of the spring set.

Here, the torsional operation of the torsion springs 54a and 54b in each spring set is described with reference to FIGS. 4 and 5. FIGS. 4 and 5 show the structure of each member in simplified form and are only provided for the purpose of explaining the operation. FIG. 4 shows the neutral state. From this state, it is assumed that the driven member 53 and the turbine 22 are fixedly coupled to a member not shown in the figure and that the piston 51 is twisted in rotational direction R1 with respect to said member. When this is done, as shown in FIG. 5, the torsion spring 54a is compressed in the rotational direction between the claw part 51e on the R2 side and the end face of the first window part 55d on the R1 side, while the torsion spring 54b is compressed in the rotational direction between the end face of the second window part 55f on the R2 side and torque transmitting part 53d of the driven member 53 on the R1 side. When this operation occurs, the spring holder 55 functions as an intermediate float body for which the portion enclosed in a chain line (a section 61, a section 62 and a intermediate section 63) shown in FIGS. 4 and 5 executes the torque transmission. In particular, the section 61 (the third abutting part) comprises the R1 side end face of first window part 55d. The section 62 (the fourth abutting part) comprises the R2 side end face of the second window part 55f. The intermediate section 63 (the connecting part) serves to connect the other two sections 61 and 62. Thus, the spring holder 55 can be thought of as a member comprising a plurality of these intermediate float bodies connected in a ring-shape.

The intermediate section 63 functions as an intermediate support part that supports the inner circumferential sides of the torsion springs 54a and the outer circumferential sides of the torsion springs 54b. Furthermore, the first support parts 55e and the outer circumferential portions of the first window parts 55d support the outer circumferential sides of the torsion springs 54a, and the second support parts 55g and the inner circumferential portions of the second window parts 55f support the inner circumferential sides of the torsion springs 54b.

When torsional vibrations are imparted as previously described and the torsion springs 54a and 54b are compressed repeatedly, the torsion springs 54a and 54b move radially outward due to centrifugal force and slide along the spring holder 55. However, since the spring holder 55 also moves in the rotational direction along with the torsion springs 54a and 54b, the sliding resistance between the two members is extremely small. Therefore, the torsional vibration absorption performance is sufficiently maintained.

With the lockup device 7, the torsion springs 54a and 54b are held by the spring holder 55 and the driven member 53. As a result, several advantageous effects are obtained. First, cost and weight can be reduced because it is not necessary to provide a part for holding the elastic elements to the piston 51. Second, the inertia of the piston 51 is reduced and the lockup response is improved. Third, the wall thickness of the piston 51 can be reduced so that the rigidity is lowered and elastic deformation is possible. As a result, the frictional performance of the piston 51 is improved.

Furthermore, the invention has good spatial efficiency because the spring holder 55, the torsion springs 54a and 54b, and the driven member 53 can be arranged in the leftover space between the outer circumferential section of the piston 51 and the outer circumferential section of the turbine 22. In other words, the existence of these members will not cause the axial dimension of the torque converter to be excessively large. In particular, the leftover space is used efficiently because the torsion springs 54a and 54b are arranged in the radial direction along the turbine shell 30 of the turbine 22.

The structure of the lockup device 7 is not limited to that presented in the previously described embodiment. For example, the present invention can also be used in a multiple clutch lockup device in which several plates are arranged between the piston and the front cover. It is also acceptable to provide the torsion springs on the piston side.

With the elastic coupling mechanism of the present invention, the first elastic element and second elastic element (the torsion springs 54a and 54b), which act as if they were arranged end to end in the rotational direction, are aligned not in the rotational direction but in the radial direction. Therefore, a high twisting torque can be established by increasing the number of spring sets or the like.

SECOND EMBODIMENT

Referring now to FIGS. 6–12, a torque converter 1' is illustrated in accordance with a second embodiment. Basically, the only differences between the first and second embodiments are the constructions of the lockup devices 7 and 7'. In view of the similarity between the first and second embodiments, the parts of the second embodiment that are identical to the parts of the first embodiment will be given the same reference numerals as the parts of the first embodiment.

Figure 6:
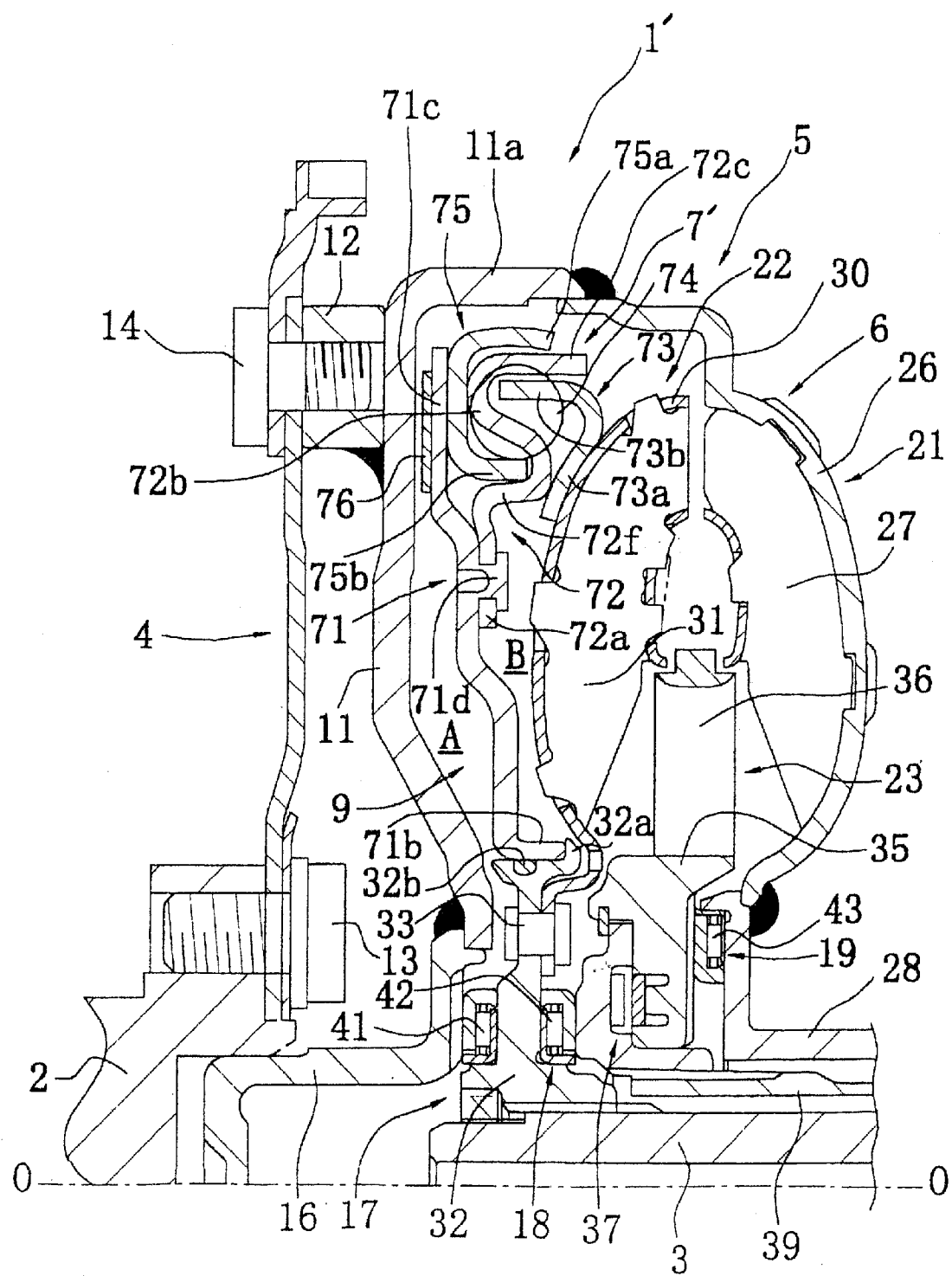
FIG. 6 is a partial schematic vertical cross sectional view of a torque converter in accordance with a second embodiment of the present invention.
Figure 7:
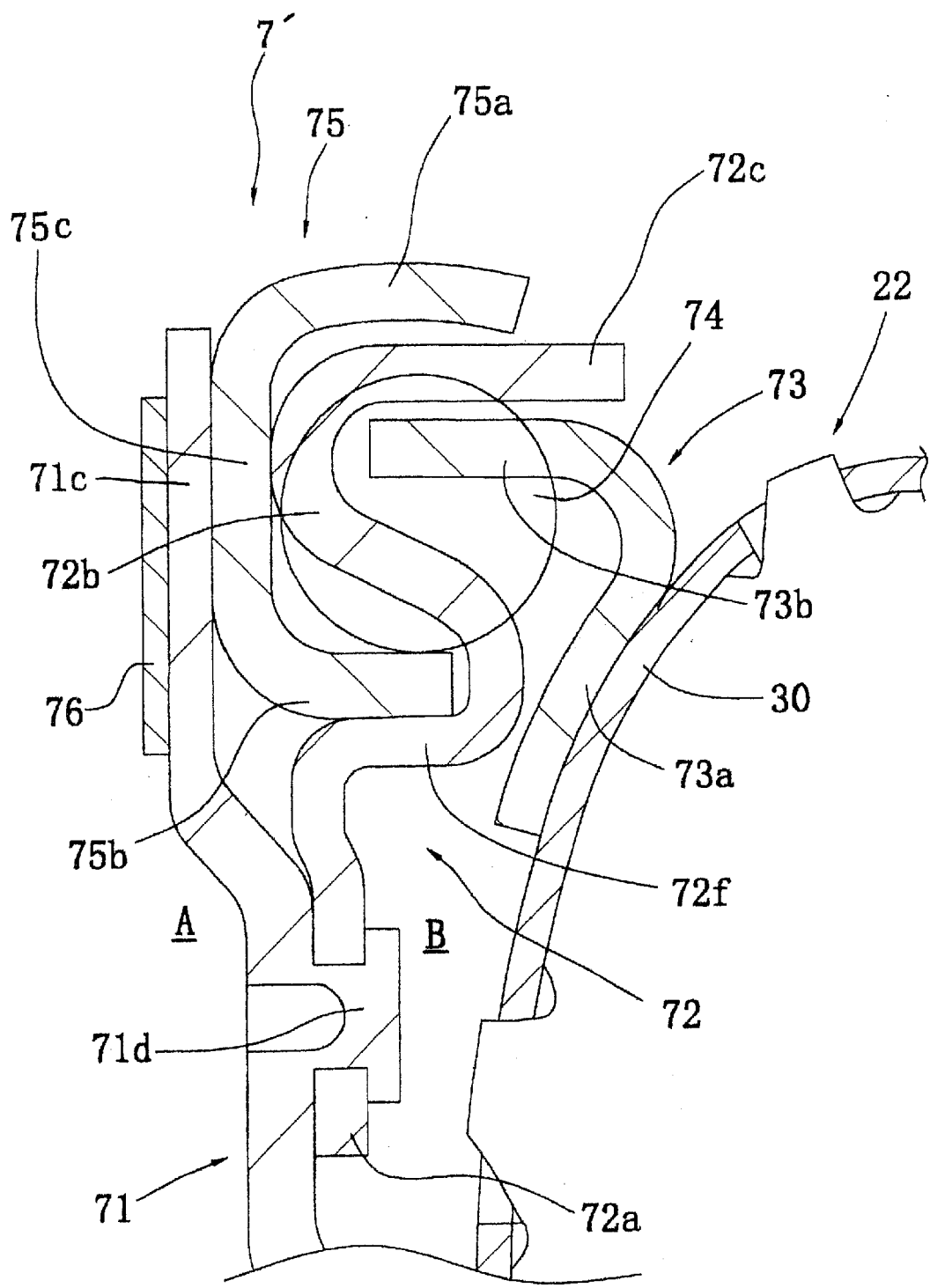
FIG. 7 is an enlarged partial cross sectional view of the torque converter illustrated in FIG. 6, taken along line 7—7 of FIG. 8.
Figure 8:
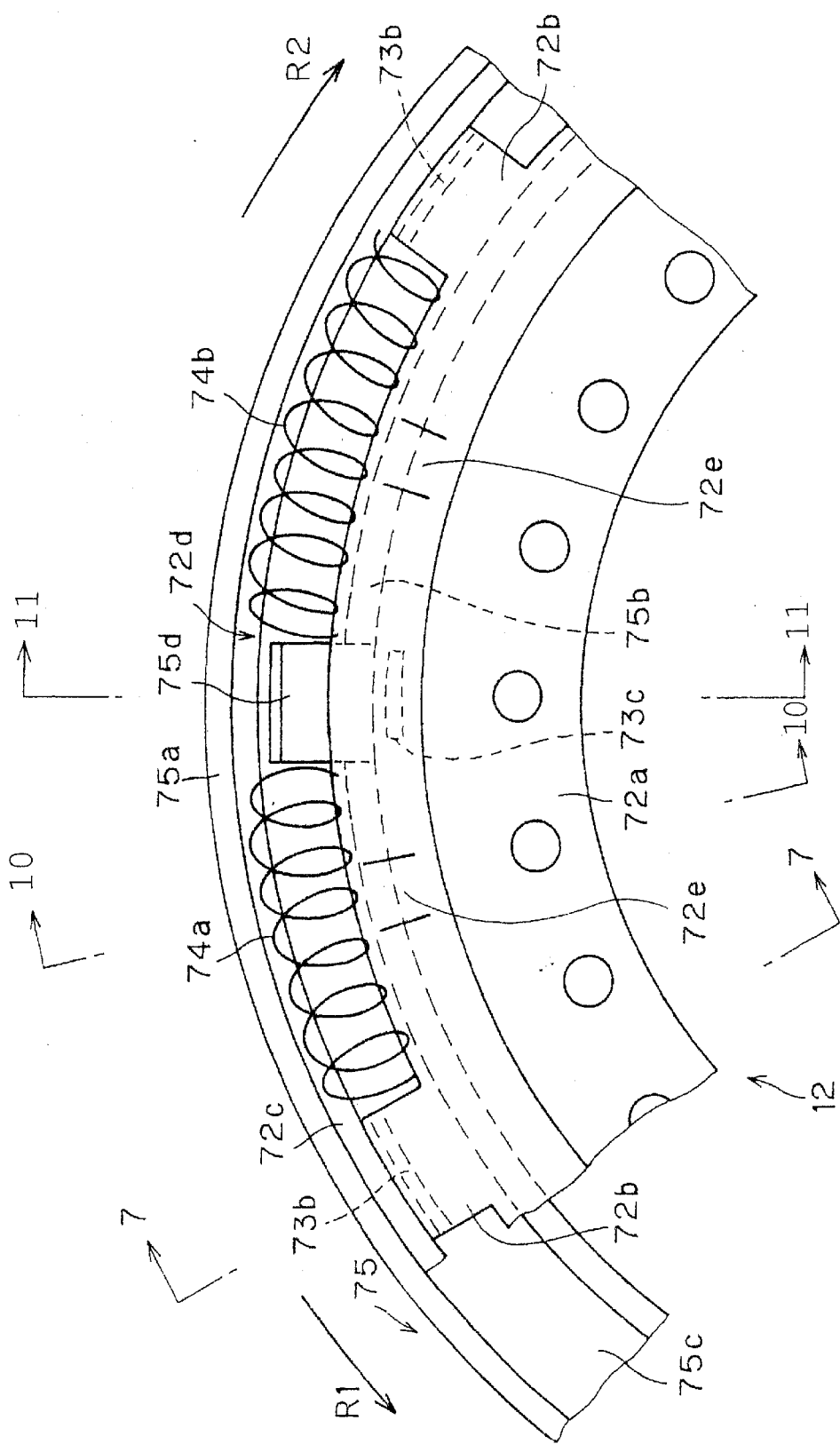
FIG. 8 is a partial elevational view of an elastic coupling mechanism of the lockup device for the torque converter illustrated in FIG. 6.
Figure 9:
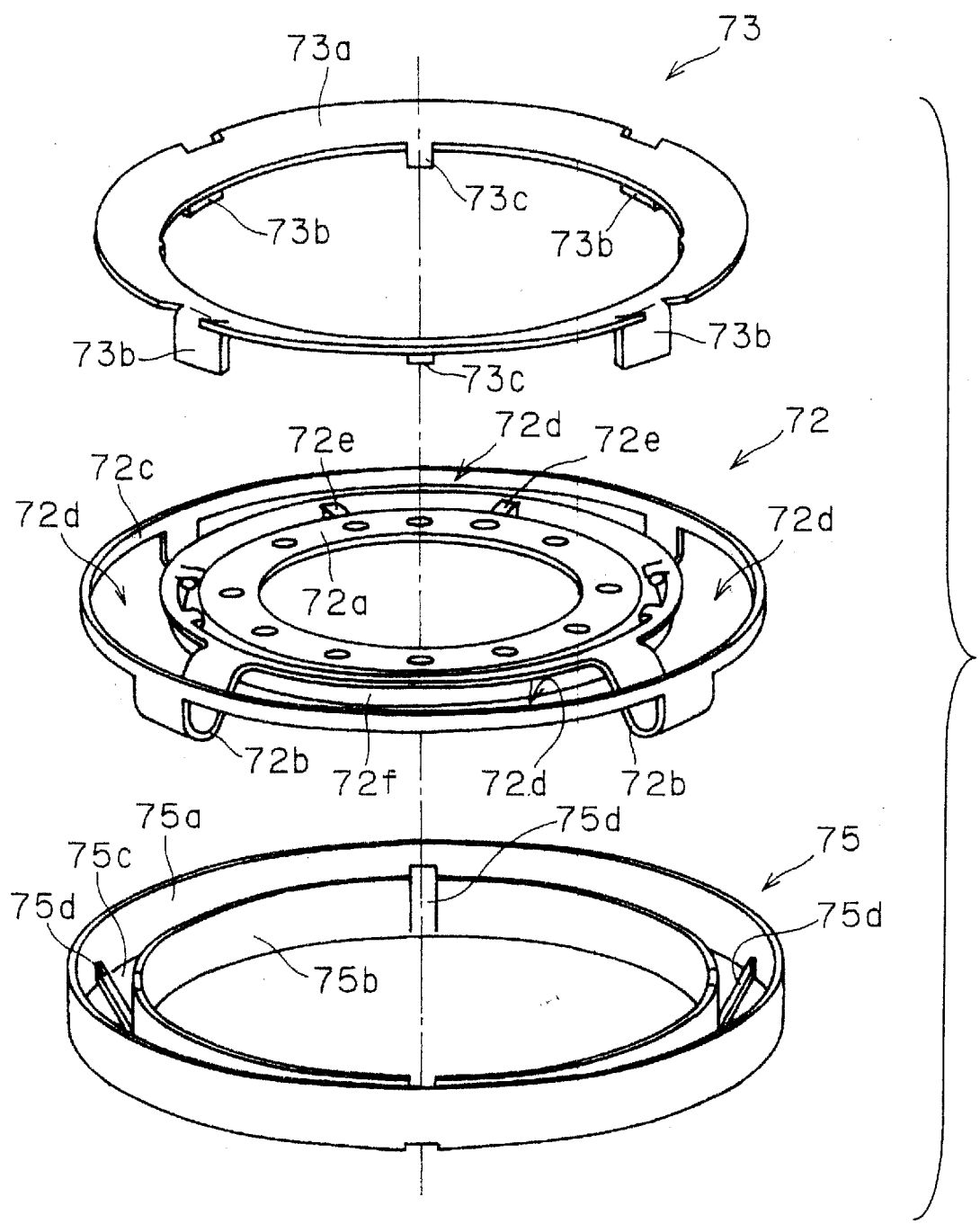
FIG. 9 is an exploded perspective view of selected members of the lockup device for the torque converter illustrated in FIG. 6.
Figure 10:
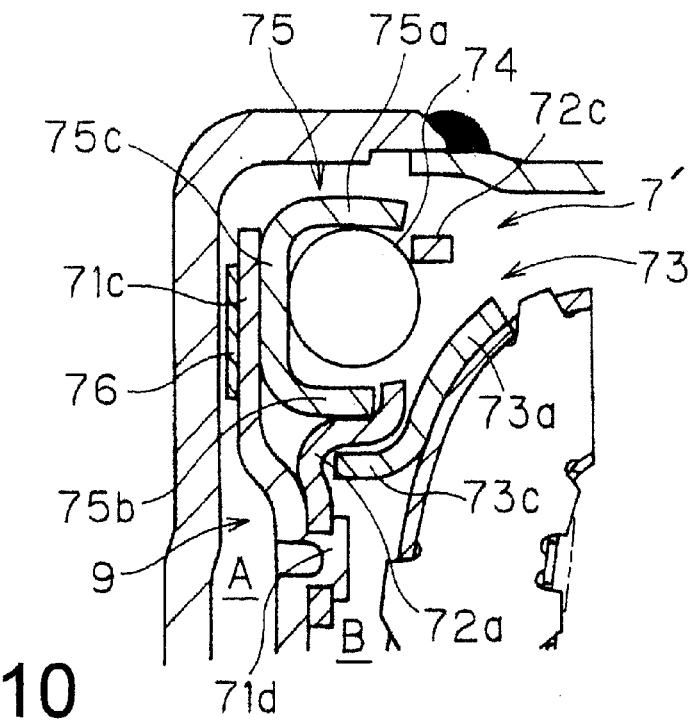
FIG. 10 is partial cross sectional view of the lockup device for the torque converter taken along line 10—10 of FIG. 8.

FIG. 6 is a partial schematic vertical cross sectional view of torque converter 1' in accordance with a second embodiment of the present invention. The torque converter 1' is a device for transmitting a torque from a crankshaft 2 of an engine to an input shaft 3 of a transmission. Although not shown, the engine is arranged on the left side in FIG. 6, and the transmission is arranged on the right side in FIG. 6. The center line O—O in FIG. 6 indicates a rotation shaft of the torque converter 1'. An arrow R1 indicates a drive side in the rotating direction of the torque converter 1', and an arrow R2 indicates the opposite side.

The torque converter 1' basically includes a flexible plate 4 and a torque converter body 5. The flexible plate 4 is formed of a thin disk-like member, and is employed for transmitting the torque and absorbing bending vibrations transmitted from the crankshaft 2 to the torque converter body 5. Accordingly, the flexible plate 4 has rigidity in the rotating direction enough to transmit the torque, and also has a low rigidity in the bending direction.

The front cover 11 is a disk-like member, and is arranged near the flexible plate 4. A center boss 16 is welded to the inner periphery of the front cover 11. The center boss 16 is axially extending cylindrical member, and is fitted into a central hole of the crankshaft 2.

The front cover 11 is a disk-like member, and is arranged near flexible plate 4. A center boss 16 is welded to the inner periphery of the front cover 11. The center boss 16 is an axially extending cylindrical member, and is fitted into a central hole of the crankshaft 2.

The radially inner portion of the flexible plate 4 is fixedly coupled to an end surface of the crankshaft 2 by a plurality of bolts 13. A plurality of nuts 12, which are circumferentially equally spaced from each other, are fixedly coupled to the surface on the engine side of the radially outer portion of the front cover 11. Bolts 14 are screwed into the nuts 12 for fixing the radially outer portion of the flexible plate 4 to the front cover 11, respectively.

The front cover 11 is provided at its radially outer portion with an outer cylindrical portion 11a extending axially toward the transmission. An outer periphery of an impeller shell 26 of the impeller 21 is welded to the end of the outer cylindrical portion 11a. As a result, the front cover 11 and the impeller 21 define a fluid chamber filled with the working oil or fluid. The impeller 21 basically includes an impeller shell 26, a plurality of impeller blades 27 fixedly coupled to the inner side of the impeller shell 26 and an impeller hub 28 fixedly coupled to the radially inner portion of the impeller shell 26.

The turbine 22 is disposed in the fluid chamber, and is axially opposed to the impeller 21. The turbine 22 basically includes a turbine shell 30, a plurality of turbine blades 31 fixedly coupled to the surface, on the impeller side, of the turbine shell 30 and a turbine hub 32 fixedly coupled to the inner periphery of the turbine shell 30. The turbine shell 30 and the turbine hub 32 are fixed together by a plurality of rivets 33.

The turbine hub 32 is provided at its inner peripheral surface with spline teeth engaged with the input shaft 3. Thereby, the turbine hub 32 rotates together with the input shaft 3.

The stator 23 is a mechanism for rectifying or regulating the flow of the working fluid returning from the turbine 22 toward the impeller 21. The stator 23 is formed of a molded member of resin, aluminum alloy or the like. The stator 23 is disposed between the radially inner portions of the impeller 21 and the turbine 22. The stator 23 basically includes an annular stator shell 35 and a plurality of stator blades 36 arranged on the outer peripheral surface of the shell 35. The stator shell 35 is supported on a cylindrical fixed shaft 39 via a one-way clutch 37. The fixed shaft 39 extends between the outer peripheral surface of the input shaft 3 and the inner peripheral surface of the impeller hub 28.

The shells 26, 30 and 35 of the bladed wheels 21, 22 and 23 described above define the fluid operation chamber 6 of the torus form within the fluid chamber. In the fluid chamber, an annular space 9 is kept between the front cover 11 and the fluid operation chamber 6.

The one-way clutch 37 shown in the figure employs a ratchet, but can be employ a roller and sprag mechanism.

A first thrust bearing 41 is arranged axially between the radially inner portion of the front cover 11 and the turbine hub 32. In the portion where the first thrust bearing 41 is arranged, a first port 17 is formed for allowing radial flow of the working fluid. The first port 17 connects an oil passage formed in the input shaft 3 to a first hydraulic chamber A (to be described later) and a space between the turbine 22 and the front cover 11. A second thrust bearing 42 is arranged between the turbine hub 32 and the radially inner portion (more specifically, the one-way clutch 37) of the stator 23. In the portion where the second thrust bearing 42 is disposed, a second portion 18 is formed for allowing flow of the working fluid between the radially opposite portions. More specifically, the second port 18 connects the oil passage between the input shaft 3 and the fixed shaft 39 to the fluid operation chamber 6. Further, a third thrust bearing 43 is disposed axially between the stator 23 (more specifically, shell 35) and the impeller 21 (more specifically, impeller hub 28). In the position where the third thrust bearing 43 is disposed, a third port 19 is formed for flowing the working fluid between the radially opposite portions. More specifically, the third port 19 connects the oil passage between the fixed shaft 39 and the impeller hub 28 to the fluid operation chamber 6. Each oil passage is connected to a hydraulic circuit (not shown) so that the working fluid can be supplied to and discharged from each of the first to third ports 17 to 19 independently of the others.

The lockup device 7' is disposed in the space 9 between the turbine 22 and the front cover 11 for mechanically coupling them together when necessary. The lockup device 7' is arranged in an axial space between the front cover 11 and the turbine 22. The lockup device 7' has a nearly disk-like form as a whole, and substantially axially divides the space 9. The space thus formed between the front cover 11 and the lockup device 7' will be referred to hereinafter as a "first hydraulic chamber A", and the space thus formed between the lockup device 7' and the turbine 22 will be referred to hereinafter as a "second hydraulic chamber B".

The lockup device 7' has functions of a clutch and an elastic coupling mechanism, and basically includes a piston 71, a drive plate 72, a driven plate 73, a plurality of torsion springs or elastic members 74a and 74b, and a spring holder 75. As used herein, the phase "elastic member" can include one or elastic elements (springs).

The piston 71 is a member for engaging and releasing the clutch, and further functions as an input member in the elastic coupling mechanism formed of the lockup device 7'. The piston 71 has a disk-like form provided with a central aperture. The piston 71 extends substantially the entire radial width of the space 9 so that piston 71 axially divides the space 9 into two sections or chambers. The piston 71 is provided at its inner periphery with an inner cylindrical portion 71b extending axially toward the transmission. The inner cylindrical portion 71b is supported on the outer peripheral surface of the turbine hub 32 for movement in the rotating direction and axial direction. The turbine hub 32 is provided at its outer peripheral surface with a flange 32a, which is in contact with the inner cylindrical portion 71b for restricting the axial movement of the piston 71 toward the transmission. The turbine hub 32 is provided at its outer peripheral surface with a seal ring 32, which is in contact with the inner peripheral surface of the inner cylindrical portion 71b. Thereby, axial sealing is effected on the inner periphery of the piston 71. A frictional coupling portion 71c is formed on the radially outer portion of the piston 71. The frictional coupling portion 71c has an annular form and a predetermined radial length, and has a flat form, of which surfaces on the axially opposite sides are perpendicular to the axial direction. An annular friction facing 76 is fixedly coupled to the engine side of the frictional coupling portion 71c. The piston 71 and the flat friction surface of the front cover 11 form a structure of the clutch of the lockup device 7'.

The piston 71 is not provided at its outer periphery with a cylindrical portion or the like extending in the axial direction.

The drive plate 72 is arranged on the transmission side of the radially outer portion of the piston 71. The drive plate 72 is an annular member formed by press working. The drive plate 72 is formed of an annular portion 72a, torque transmitting portions 72b extending radially outward from the annular portion 72a, and a coupling portion 72c. The annular portion 72a is in contact with the surface on the transmission side of the piston 71, and is fixedly coupled to the piston 71 by a plurality of caulked portions 71d. The torque transmitting portion 72b extends radially outward from the annular portion 72a. More specifically, the torque transmitting portion 72b extends radially outward, and is smoothly curved such that the radially inner portion preferably has a convex section when viewed from the transmission side, and the radially middle and outer portions preferably have a convex section when viewed from the engine side. The outer end portion of the torque transmitting portion 72b has a cylindrical form extending axially toward the transmission. The radially outer ends of the torque transmitting portions 72b are connected together by the annular coupling portion 72c. The annular portion 72a is provided at its radially outer portion with a plurality of engagement portions 72e extending axially toward the transmission. Each engagement portion 72e is cut at circumferential opposite ends, and is bent to project axially toward the transmission beyond the other portions.

A spring accommodating portion 72d is formed in the rotating direction between the neighboring torque transmitting portions 72b. In this embodiment, the spring accommodating portions 72d are four in number.

Each spring accommodating portion 72d accommodates a pair of torsion springs 74a and 74b. Preferably, the torsion springs 74a are coil springs that extend in the circumferential direction. The torsion springs 74a and 74b are arranged end to end in each spring accommodating portion 72d to compress and expand together in the rotating direction. Thus, the lockup device 7' employs the torsion springs of eight in total number. The torsion springs 74a and 74b can each be a single member such as a single coil spring, or they each can be a combination of a large coil spring and a small coil spring or elastic element disposed within the large coil spring. In each spring accommodating portion 72d, the torsion spring on the R1 side in the rotating direction is represented as the torsion spring 74a, and the torsion spring on the R2 side in the rotating direction is represented as the torsion spring 74b.

The driven plate 73 is a member for transmitting the torque from the torsion springs 74 to the turbine 22. The driven plate 73 is an annular member formed by press working, and is arranged radially outside the turbine shell 30 of the turbine 22. The driven plate 73 basically includes an annular portion 73a and a plurality of claws 73b. The annular portion 73a is fixedly coupled (welded) to the turbine shell 30. The claws 73b are bent axially toward the engine from the outer periphery of the annular portion 73a. The claws 73b correspond to the torque transmitting portions 72b of the driven plate 72, and each extend axially from the transmission side into a space defined by the curved portion, which is convex when viewed from the engine side, of the torque transmitting portion 72b. In this manner, each claw 73b is in contact with the opposite ends, in the rotating direction, of the torsion spring pair 74a and 74b disposed in each spring accommodating portion 72d. The driven plate 73 is provided with a plurality of stop claws 73c. The stop claw 73c extends axially toward the engine from the inner periphery of the annular portion 73a. Each stop claw 73c is disposed between the engagement portions 72e of the drive plate 72. When the drive and driven plates 72 and 73 rotate relatively to each other to a large extent, the stop claw 73c comes into contact with the engagement portion 72e on either side in the rotating direction so that the compression of the springs 74 stops, and thus the damper operation stops.

The spring holder 75 is a member for radially supporting the torsion spring 74, and is rotatable with respect to the driven and drive plates 72 and 73. The spring holder 75 basically includes a radially outer support portion 75a, a radially inner support portion 75b and a coupling portion 75c. The coupling portion 75c is substantially a disk-like member, and is in contact with the surface, on the transmission side, of the frictional coupling portion 71c of the piston 71. Thus, the coupling portion 75c is disposed axially between the frictional coupling portion 71c of the piston 71 and the torque transmitting portion 72b of the drive plate 72. The outer support portion 75a axially extends from the outer periphery of the coupling portion 75c toward the transmission side, and has a cylindrical form. The outer support portion 75a is disposed near the outer periphery of the torsion spring 74. The outer support portion 75a is disposed radially outside the cylindrical portion of the torque transmitting portion 72b. The inner support portion 75b axially extends from the inner periphery of the coupling portion 75c toward the transmission, and has a cylindrical form. The inner support portion 75b is axially fitted from the engine side into a space defined by a smoothly curved portion of the torque transmitting portion 72b having a convex form when viewed axially from the engine side. The inner support portion 75b is located near the inner periphery of the torsion spring 74.

As can be seen from the above, the spring holder 75 has a cross section having a substantially C-shaped form opening in an axially one direction.

The inner pressing surface of the inner support portion 75b is in contact with the outer peripheral surface of the cylindrical portion (socket portion) 72f formed in the annular portion 72a. In this manner, the cylindrical portion 72f radially positions the spring holder 75. In other words, the spring holder 75 is supported by the drive plate 72, which serves as a restricting portion to restrict the relative rotation and radially outward movement of the spring holder 75. Owing to the above structure, the spring holder 75 can bear the load of the torsion springs 74, which are moved radially outward by the centrifugal force.

Figure 11:
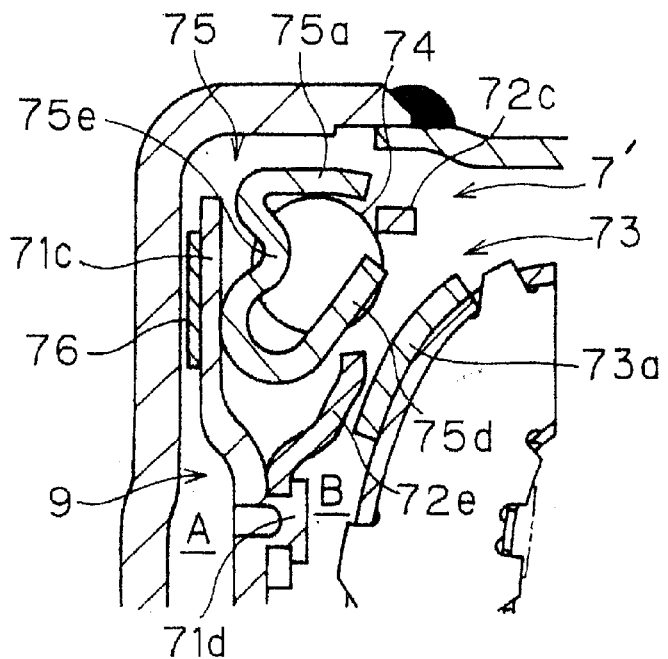
FIG. 11 is partial cross sectional view of the lockup device for the torque converter taken along line 11—11 of FIG. 8.
Figure 12:
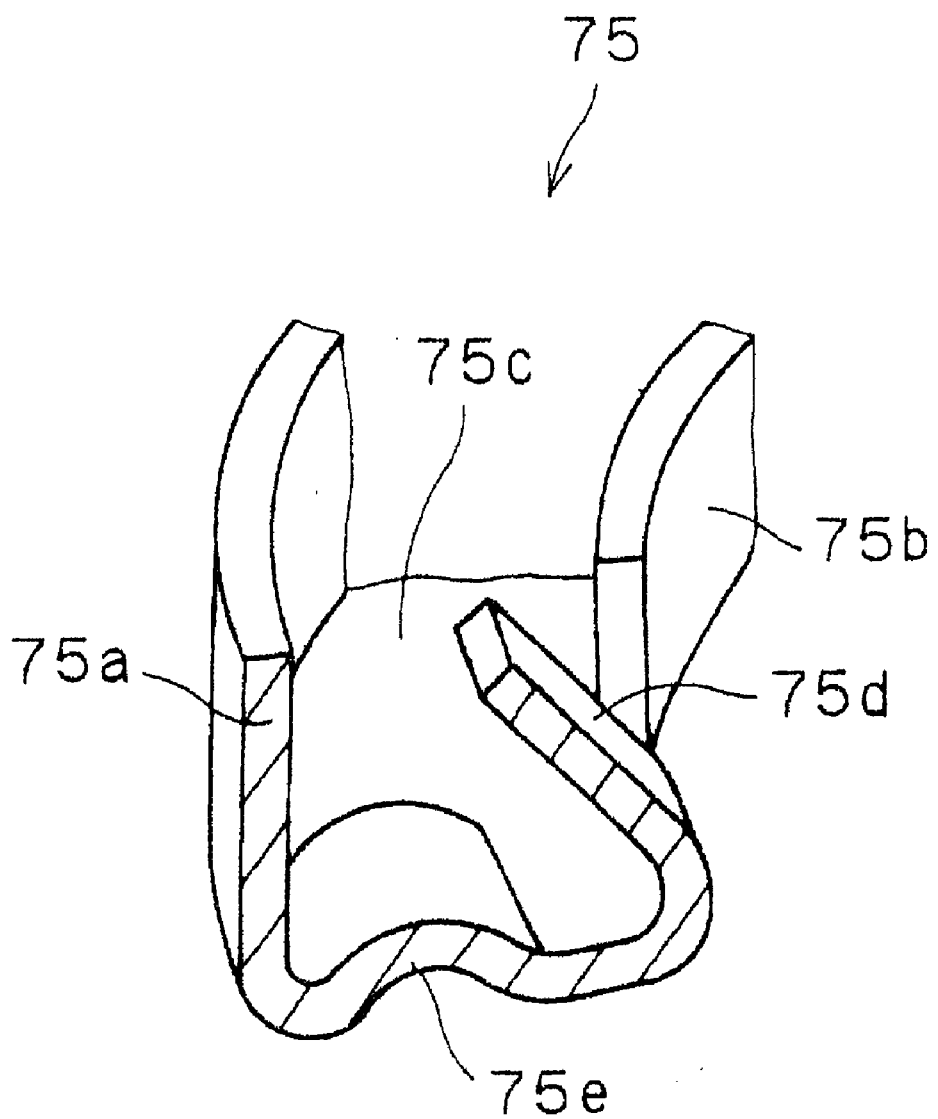
FIG. 12 is a partial perspective view of a spring holder of the lockup device for the torque converter illustrated in FIG. 6.

As shown in FIGS. 11 and 12, the spring holder 75 is provided with first and second torque transmitting portions 75d and 75e. The first torque transmitting portion 75d is a claw portion, which is formed by cutting and bending radially outward a portion of the inner support portion 75b, and is arranged between the paired torsion springs 74a and 74b located within each spring accommodating portion 72d. The second torque transmitting portion 75e is formed corresponding to the first torque transmitting portion 75b by partially cutting and bending the coupling portion 75c, and has a convex form projecting axially toward the engine. The second torque transmitting portion 75e is arranged between the paired torsion springs 74a and 74b arranged within each spring accommodating portion 72d. As described above, the spring holder 75 has the torque transmitting portions 75d and 75e for the paired torsion springs 74a and 74b so that the spring holder 75 serves as an intermediate float member.

OPERATION OF TORQUE CONVERTER OF FIG. 6

Immediately after the start of the engine, the working fluid is supplied from the first and third ports 17 and 19 into the torque converter body 5, and is discharged from the second port 18. The working fluid supplied from the first port 17 flows radially outward in the first hydraulic chamber A, and flows through the second hydraulic chamber B into the fluid operation chamber 6. Thereby, the hydraulic difference between the first and second hydraulic chambers A and B moves the piston 71 axially toward the engine. More specifically, the friction facing 76 moves away from the front cover 11 so that the lock-up state is released.

When the lock-up state is released, the torque transmission between the front cover 11 and the turbine 22 is performed via the fluid driven between the impeller 21 and the turbine 22.

When the speed ratio of the torque converter 1' rises and the input shaft 3 reaches a constant rotation speed, the working fluid is discharged from the first hydraulic chamber A from the first portion 17. Consequently, the hydraulic pressure difference between the first and second hydraulic chambers A and B moves the piston 71 toward the front cover 11 so that the friction facing 76 is pressed against the flat friction surface of the front cover 11. Thereby, the torque of the front cover 11 is transmitted from the piston 71 to the driven plate 73 via the drive plate 72 and the torsion springs 74. Further, the torque is transmitted from the driven plate 73 to the turbine 22. More specifically, the front cover 11 is mechanically coupled to the turbine 22, and the torque of the front cover 11 is directly output to the input shaft 3 via the turbine 22.

In the engaged state of the lockup device described above, the lockup device 7' transmits the torque, and also operates to absorb and dampen the torsional vibrations transmitted from the front cover 11. More specifically, when the torsional vibrations are transmitted from the front cover 11 to the lockup device 7', the torsion springs 74 are compressed in the rotating direction between the drive and driven plates 72 and 73. More specifically, the torsion springs 74 are compressed between the torque transmitting portion 72b of the drive plate 72 and the claws 73b of the driven plate 73. In this operation, the spring holder 75 moves in accordance with the compression of the torsion springs 74, and thereby rotates relatively to the drive and driven plates 72 and 73.

When the torsion springs 74 are repetitively compressed in accordance with the torsional vibrations supplied thereto, each torsion springs 74 is moved radially outward by the centrifugal force, and thereby slides on the outer support portion 75a of the spring holder 75. However, the spring holder 75 is configured to move in the rotating direction together with the torsion spring 74 so that the sliding resistance between them is significantly small. Accordingly, the performance for absorbing the torsional vibrations is sufficiently ensured.

The spring holder 75 has several advantageous effects as compared to conventional structures. First, the spring holder 75 supports the radially outer side of the torsion spring 74 by its outer supporting portion 75a, during which the cylindrical portion 72f of the drive plate 72 restricts the radially outward movement thereof. Since the spring holder 75 restricts the radially outward movement of the torsion spring 74, an outer cylindrical portion can be eliminated from the disk-like piston 71. Second, the spring holder 75 functions as an intermediate float member with respect to the pair of torsion springs 74a and 74b, and this simple structure allows elimination of the outer cylindrical portion of the piston. Third, the spring holder 75 has the inner support portion 75b, which is radially positioned by the drive plate 72, so that the hysteresis is smaller than that in the prior art. In particular, the radial positioning portion is located in a radially inner position than that in the prior art, which also reduces the hysteresis.

The lockup device 7' can have a structure other than that of the foregoing embodiment. For example, the invention can be applied to a lockup device employing a multiple disk clutch, in which several disks or plates are arranged between a piston and a front cover.

According to the lockup device 7' of the invention, since the support member restricts the outward movement of the elastic element, the outer cylindrical portion can be eliminated from the disk-like piston.

THIRD EMBODIMENT

Figure 13:
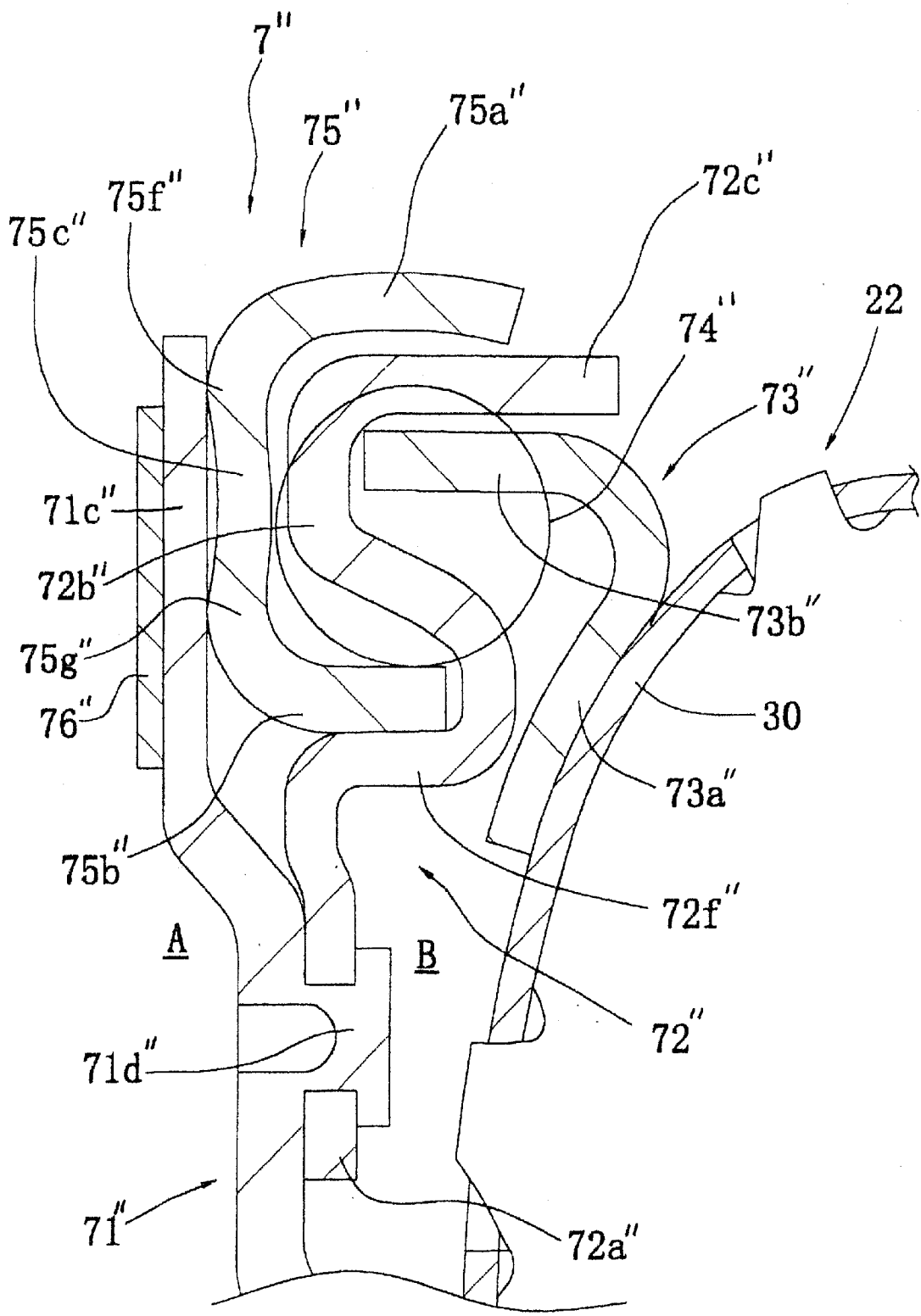
FIG. 13 is an enlarged partial cross sectional view of a modified lockup device for the torque converter illustrated in FIG. 6 in accordance with a third embodiment of the present invention.

Referring now to FIG. 13, a modified lockup device 7" is used with torque converter 1' explained in accordance with a third embodiment of the present invention. Only lockup device 7" has been modified in this third embodiment from the second embodiment. Thus, the parts of the third embodiment that are identical to the parts of the second embodiment will be given the same reference numerals as the parts of the second embodiment. Moreover, the descriptions of the parts of the third embodiment that are identical or substantially identical to the parts of the second embodiment may be omitted for the sake of brevity. The parts of the third embodiment that differ from the parts of the second embodiment will be indicated with a double prime (").

In lockup device 7", the torque transmitting portions (75d and 75e) of the foregoing embodiment have been eliminated from spring holder 75". In this case, each spring accommodating portion 72d" accommodates one torsion spring 74" that extends in the circumferential direction. As shown in FIG. 13, the radially middle portion of spring holder 75" is curved to project axially toward the transmission so that only radially outer and inner portions 75f" and 75g" of coupling portion 75c" can slide on the frictional coupling portion 71c" of the piston 71". Thereby, the state of sliding between the piston 71" and the spring holder 75" changes from the surface contact into the line contact so that the frictional sliding (hysteresis) between them can be reduced.

FOURTH EMBODIMENT

Figure 14:
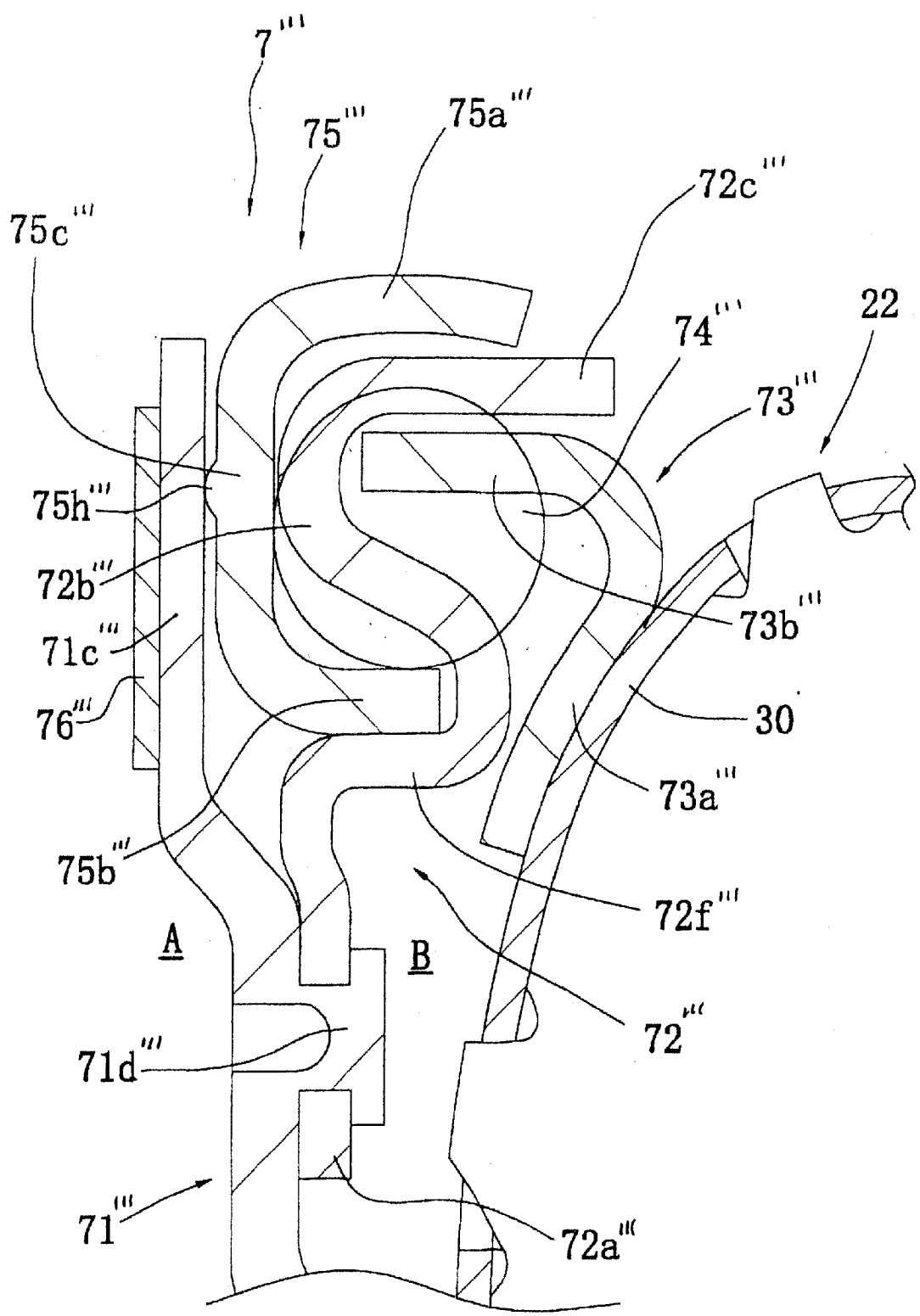
FIG. 14 is an enlarged partial cross sectional view of a modified lockup device of the torque converter illustrated in FIG. 6 in accordance with still a fourth embodiment of the present invention.
Figure 15:
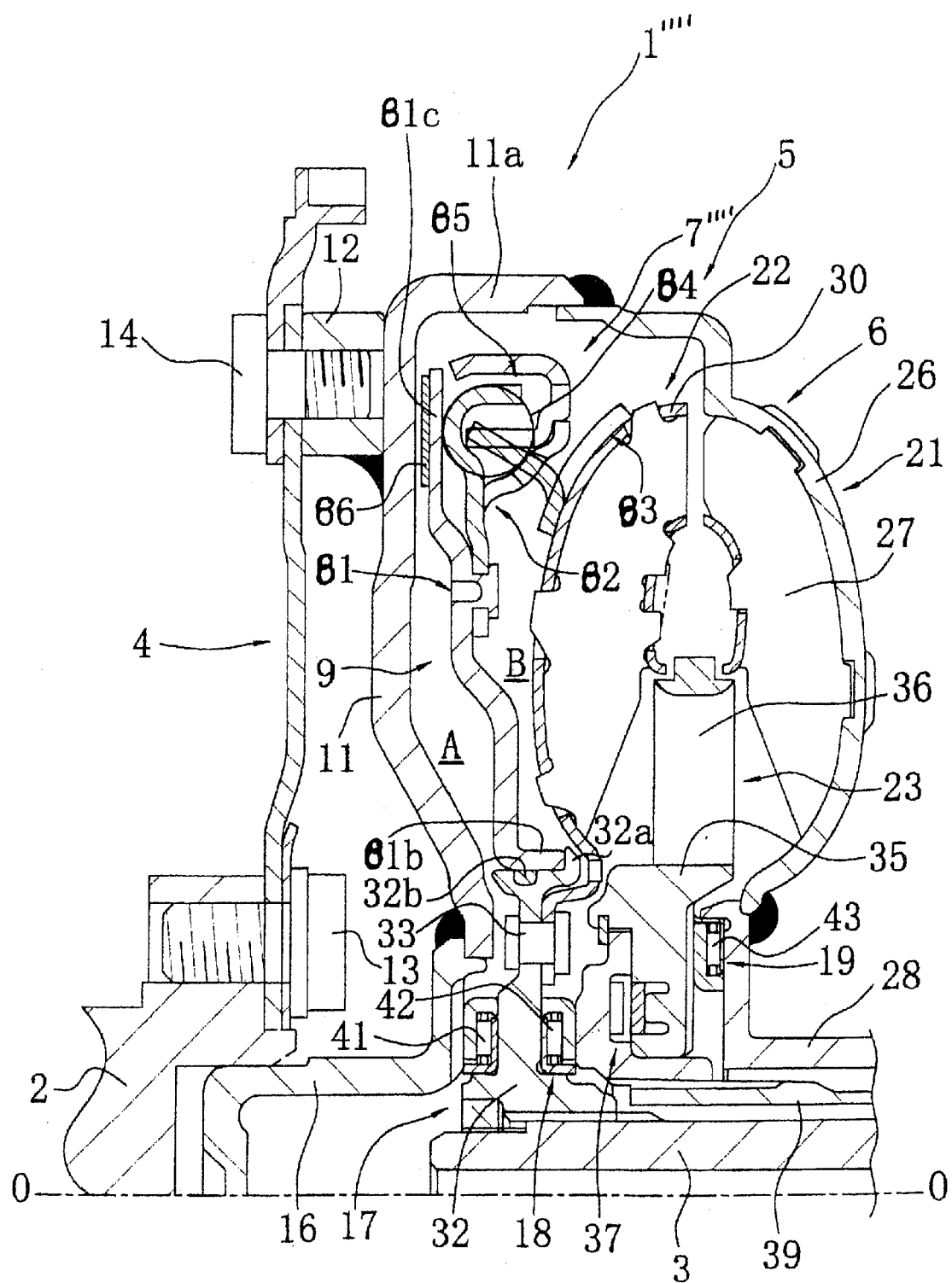
FIG. 15 is a partial schematic vertical cross sectional view of a torque converter in accordance with a fifth embodiment of the present invention.
Figure 16:
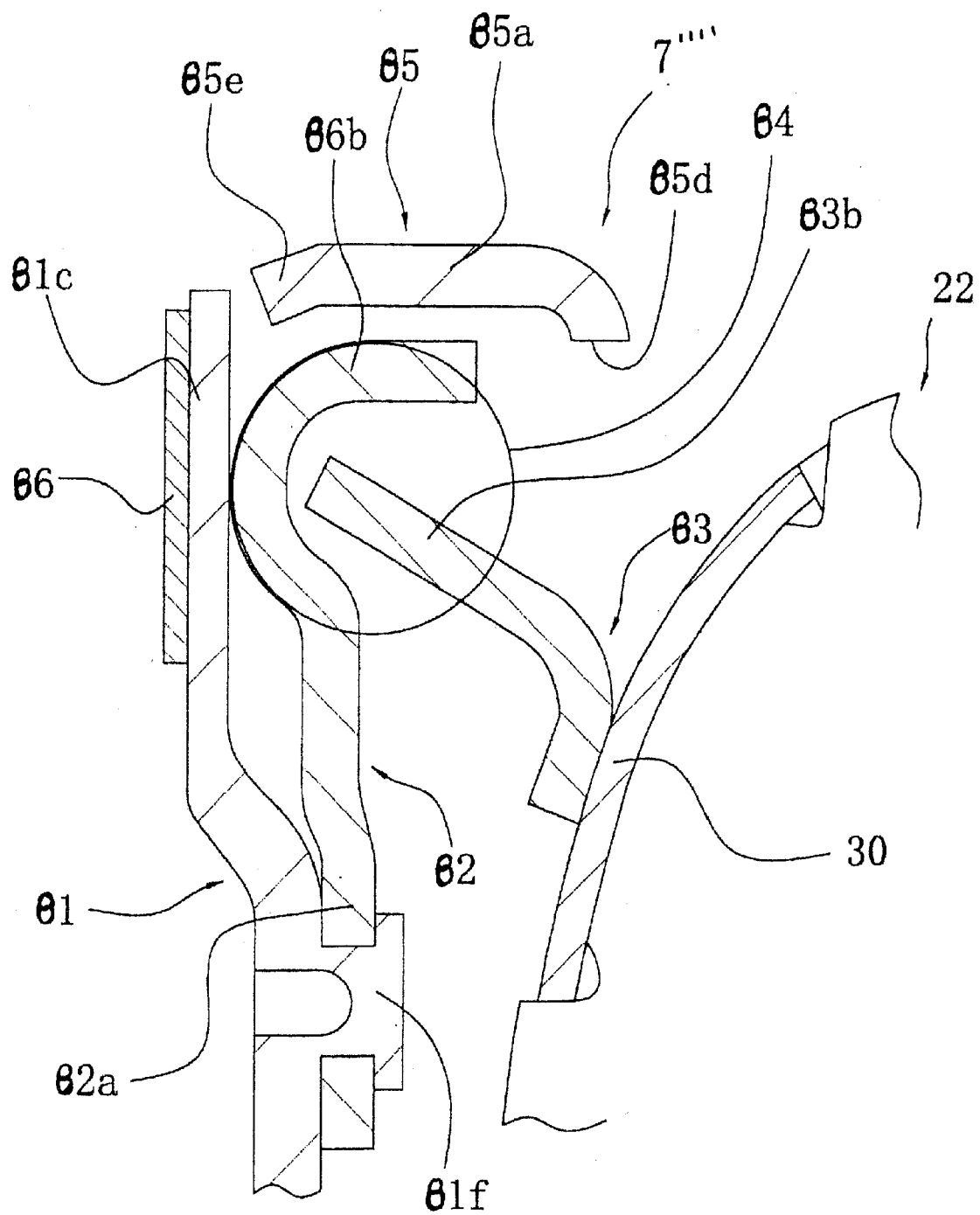
FIG. 16 is partial cross sectional view of the lockup device for the torque converter illustrated in FIG. 15.
Figure 17:
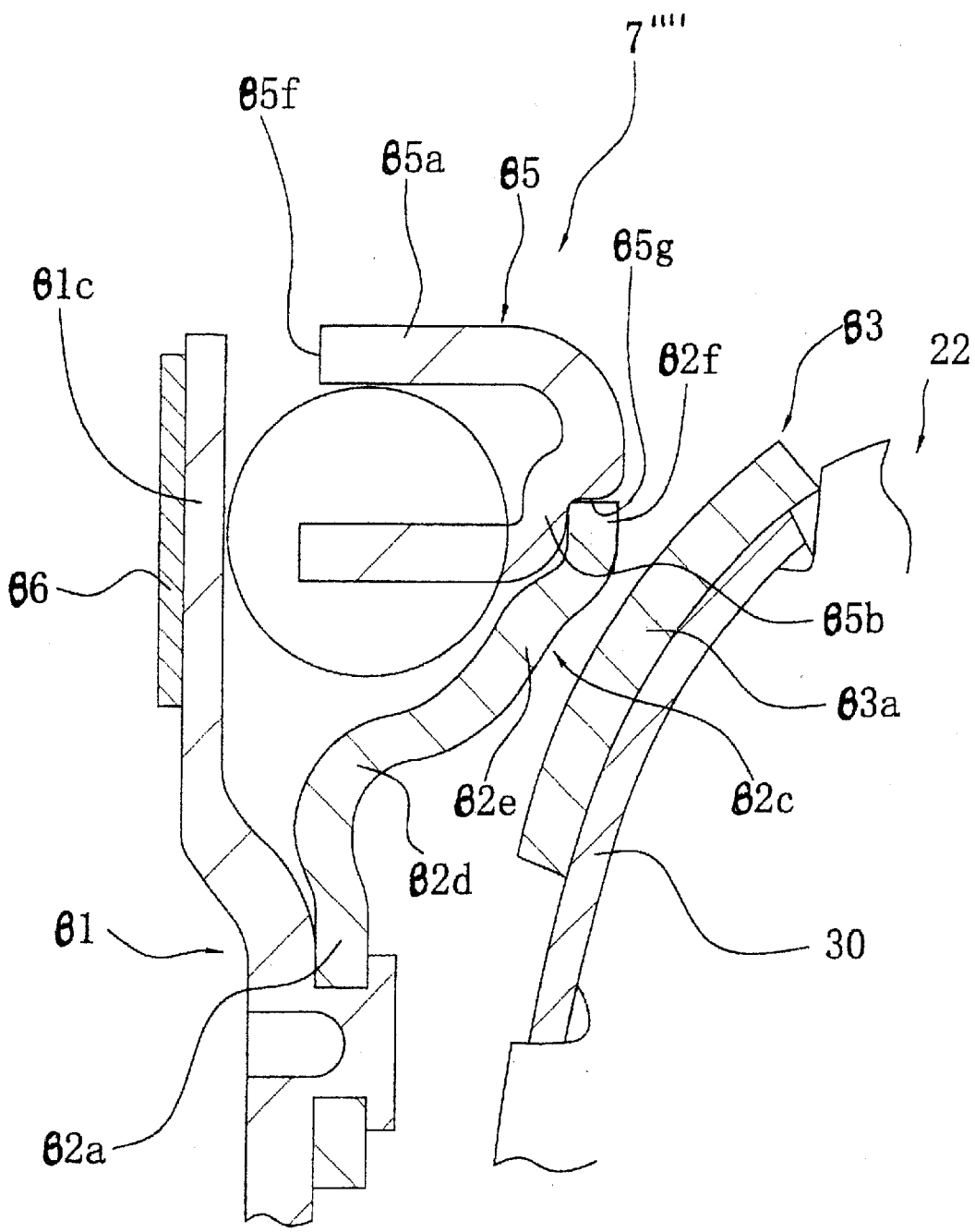
FIG. 17 is partial cross sectional view of the lockup device corresponding to FIG. 16, but showing a portion different from that in FIG. 16.

Referring now to FIG. 14, a modified lockup device 7'" is used with torque converter 1' explained in accordance with a fourth embodiment of the present invention. Only lockup device 7'" has been modified in this fourth embodiment from the second embodiment. Thus, the parts of the fourth embodiment that are identical to the parts of the second embodiment will be given the same reference numerals as the parts of the first embodiment. Moreover, the descriptions of the parts of the fourth embodiment that are identical or substantially identical to the parts of the second embodiment may be omitted for the sake of brevity. The parts of the fourth embodiment that differ from the parts of the second embodiment will be indicated with a triple prime ('").

As shown in FIG. 14, the coupling portion 75c'" is provided with a plurality of annular projection 75h'" (only one shown) projecting axially toward the engine. In this case, only the projections 75h'" are in contact with the frictional coupling portion 71c'" of the piston 71'". In this case, line contact also occurs between the piston 71'" and the spring holder 75'" instead of the surface contact, and thereby the frictional sliding (hysteresis) between them can be small. The annular convex portion can be arranged on the piston side.

FIFTH EMBODIMENT

Referring now to FIG. 15–18, a torque converter in accordance with a fifth embodiment will now be explained. In the fifth embodiment shown in FIGS. 15–18, the basic structure of the torque converter 1"" is substantially the same as that of the torque converter 1' of the second embodiment. Thus, the parts of the fourth embodiment that are identical to the parts of the second embodiment will be given the same reference numerals as the parts of the first embodiment. Moreover, the descriptions of the parts of the fourth embodiment that are identical or substantially identical to the parts of the second embodiment may be omitted for the sake of brevity, and the following description will be given primarily on the differences from the second embodiment.

The lockup device 7"" is disposed in the space 9 between the turbine 22 and the front cover 11 for mechanically coupling them together when necessary. The lockup device 7"" has a nearly disk-like form as a whole, and substantially axially divides the space 9. The space thus formed between the front cover 11 and the lockup device 7"" will be referred to hereinafter as a "first hydraulic chamber A", and the space thus formed between the lockup device 7"" and the turbine 22 will be referred to hereinafter as a "second hydraulic chamber B".

The lockup device 7"" has functions of a clutch and an elastic coupling mechanism, and basically includes a piston 81, a driven member 83, a plurality of torsion springs or elastic elements 84a and 84b and a spring holder 85. As used herein, the phase "elastic member" can include one or elastic elements (springs).

The piston 81 is a member for engaging and releasing the clutch, and further functions as an input member in the elastic coupling mechanism formed of the lockup device 7"". The piston 81 has a disk-like form provided with a central aperture. The piston 81 extends substantially the entire radial width of the space 9 so that the piston 81 axially divides the space 9 into two sections or chambers. The piston 81 is provided at its inner periphery with an inner cylindrical portion 81b extending axially toward the transmission. The inner cylindrical portion 81b is supported on the outer peripheral surface of the turbine hub 32 for movement in the rotating direction and axial direction. The turbine hub 32 is provided at its outer peripheral surface with a flange 32a, which is in contact with the inner cylindrical portion 81b for restricting the axial movement of the piston 81 toward the transmission. The turbine hub 32 is provided at its outer peripheral surface with a seal ring 32, which is in contact with the inner peripheral surface of the inner cylindrical portion 81b. Thereby, axial sealing is effected on the inner periphery of the piston 81. A frictional coupling portion 81c is formed on the radially outer portion of the piston 81. The frictional coupling portion 81c has an annular form and a predetermined radial length, and has a flat form, of which surfaces on the axially opposite sides are perpendicular to the axial direction. An annular friction facing 86 is fixedly coupled to the engine side of the frictional coupling portion 81c. The piston 81 and the flat friction surface of the front cover 11 form a structure of the clutch of the lockup device 7"".

Figure 18:
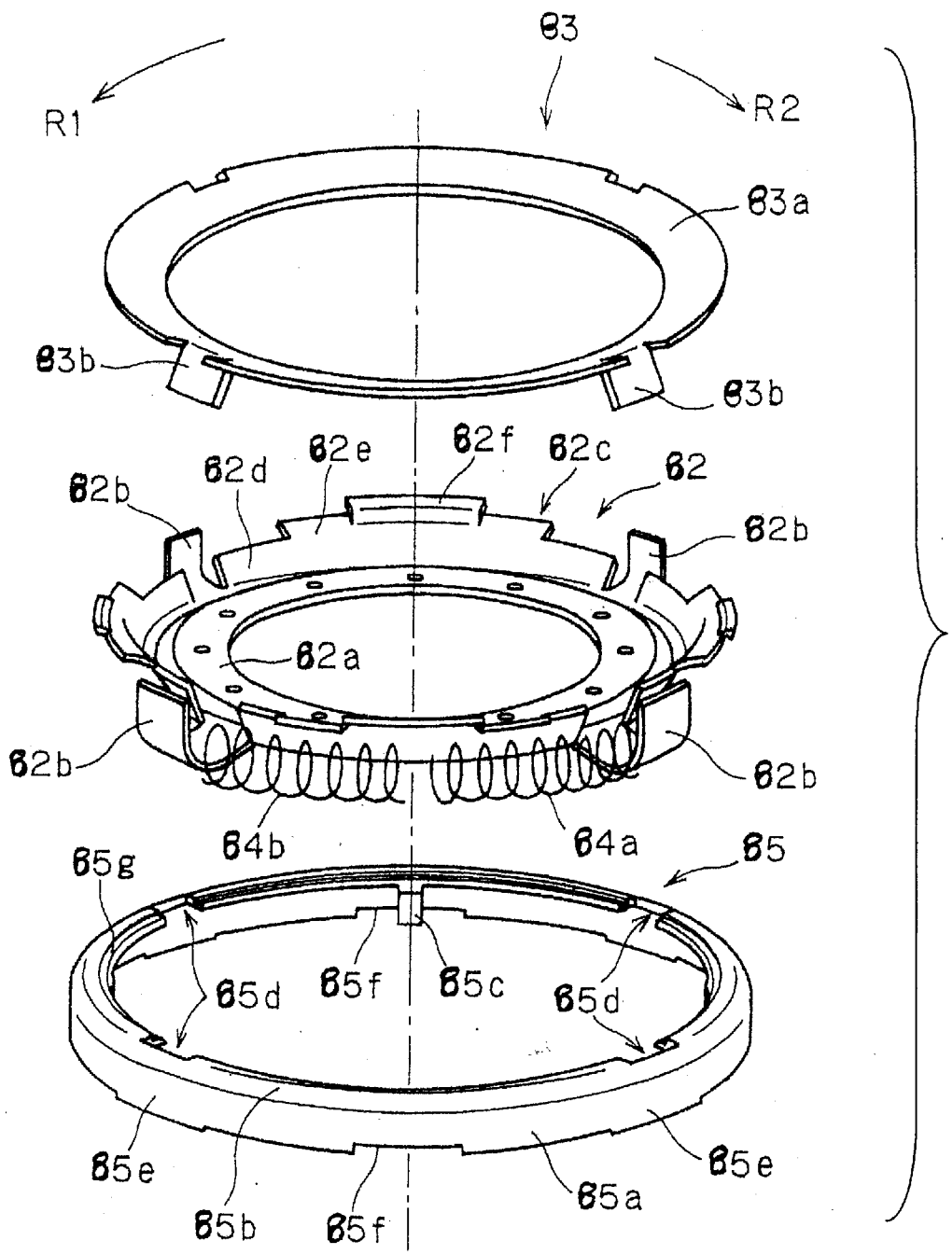
FIG. 18 an exploded perspective view of selected members of an elastic coupling mechanism of the lockup device for the torque converter illustrated in FIGS. 15–17.

A drive member 82 is fixedly coupled to the piston 81 for transmitting the torque of the piston 81 to the torsion springs 84a and 84b. As shown in FIG. 18, the drive member 82 is formed of an annular fixed portion 82a, a plurality of claws 82b extending radially outward from the fixed portion 82a, and a plurality of arc-shaped portions 82c extending radially outward from the fixed portion 82a. The fixed portion 82a is in contact with the piston 81, and is fixed thereto by a plurality of caulked portions 81f. Each claw 82b extends radially outward, is curved to provide a convex form projecting axially toward the engine, and then extends axially toward the transmission. The claws 82b employed in this embodiment are four in total number. The curved portion of each claw 82b is in contact with a frictional coupling portion 81c of the piston 81.

The arc-shaped portion 82c is formed circumferentially between the claws 82b, and has a long arc-shaped form extending along the outer periphery of the fixed portion 82a. The arc-shaped portion 82c extends radially outward, and is inclined toward the transmission as a whole. The arc-shaped portion 82c is formed of first, second and third portions 82d, 82e and 82f located in the radially inner, middle and outer portions, respectively. The first portion 82d fully occupies a circumferential area between the claws 82b. The second portion 82e extends radially outward from the first portion 82d. The second portion 82e is circumferentially shorter than the first portion 82d, and is located in the circumferentially middle portion of the first portion 82d. Therefore, the second portion 82e has end surfaces on its circumferentially opposite ends, which are circumferentially spaced from the claws 82b. The third portion 82f extends radially outward from the second portion 82e. The third portion 82f is circumferentially shorter than the second portion 82e, and is located in the circumferentially middle portion of the second portion 82e. The third portion 82f is employed for radially and axially supporting the spring holder 85, which will be described later.

An arc-shaped spring accommodating portion is formed circumferentially between the neighboring claws 82b of the drive member 82, and therefore radially outside the arc-shaped portion 82c. These spring accommodating portions employed in this embodiment are four in number.

Each spring accommodating portion is the space defined circumferentially between the claws 82b. Thus, a pair of torsion springs 84a and 84b are arranged end to end within each spring accommodating portion such that the pair of torsion springs 84a and 84b compress and expand together in the rotating direction. Thus, the torsion springs 84a and 84b employed in this embodiment are eight in total number. Each torsion springs 84a and 84b is a coil spring extending in the rotating direction. The torsion spring can be a single coil spring, and can also be a combination of a large coil spring and a small coil spring or an elastic element disposed within the large coil spring. In each spring accommodating portion, the torsion spring on the R1 side in the rotating direction is represented as the torsion spring 84a, and the torsion spring on the R2 side in the rotating direction is represented as the torsion spring 84b. The claw 82b is in contact with or close to the end on the R1 side of the torsion spring 84a, and is contact with or close to the end on the R2 side of the torsion spring 84b.

The spring holder 85 is attached to the drive member 82, and is rotatable relatively to the piston 81, drive member 82 and driven member 83. The spring holder 85 is formed of a pressed metal member, and is arranged on the transmission side with respect to the outer periphery of the frictional coupling portion 81c of the piston 81. The spring holder 85 basically includes a cylindrical portion 85a and an annular portion 85b extending radially inward from the end, on the transmission side, of the cylindrical portion 85a. The cylindrical portion 85a is arranged radially outside the torsion springs 84a and 84b. The annular portion 85b has an outer peripheral portion and an inner peripheral portion, which is axially depressed by press working toward the engine. An inner peripheral surface 85g is formed on a boundary between the outer and inner peripheral portions of the annular portion 85b. The inner peripheral surface 85g is in contact with the outer peripheral surface of the third portion 82f of the drive member 82. Owing to this contact, the spring holder 85 is radially positioned with respect to the drive member 82 and the piston 81. This fitted portion of the radial support portion is provided by a press-sheared surface, and therefore can be formed easily. The radially inner portion of the annular portion 85b is located on the engine side with respect to the third portion 82f of the drive member 82. This structure prevents the spring holder 85 from disengaging axially toward the transmission from the drive member 82 and the piston 81.

The spring holder 85 is provided with a plurality of claws 85c at its inner periphery of the annular portion 85b. The claws 85c are aligned in the rotating direction, and extend axially toward the engine. The claws 85c correspond to the third portions 82f of the drive member 82, and therefore, are formed in circumferentially middle positions between the claws 82b, respectively. Each claw 85c is located between the paired torsion springs 84a and 84b, and functions as a torque transmitting portion for coupling these springs in the rotating direction. The end of the claw 85c is located close to the curved portion of the claw 82b of the drive member 82. This restricts the axial movement of the spring holder 85 toward the transmission relatively to the drive member 82 and the piston 81.

As described above, the spring holder 85 can move in the rotating direction while being guided by the drive member 82 (i.e., being engaged unmovably in the radial and axial directions). In other words, the spring holder 85 is supported by the drive member 82 serving as the restricting portion so that the relatively rotation is allowed but the radially outward movement is restricted. Owing to this structure, the spring holder 85 can bear the load of the torsion springs 84a and 84b, which are forced radially outward. Therefore, it is not necessary to employ a cylindrical portion at the outer periphery of the piston 81 for receiving the springs.

The annular portion 85b of the spring holder 85 is provided with a plurality of recesses 85d, through which the claws 82b of the drive member 82 are moved during assembly. A projection 85e which projects axially beyond other portions is formed on an end, on the engine side, of the portion of the cylindrical portion 85a corresponding to the recess 85d. The projection 85e is employed for compensating the rigidity, which is lowered due to the recess 85d, and keeping the balance in the rotating direction. A recess 85f of an axially concave form is formed on an end, on the engine side, of the portion corresponding to the claw 85c in the cylindrical portion 85a. The recess 85f is employed for compensating the rigidity, which is increased by the claw 85c, and keeping the balance in the rotating direction.

The driven member 83 is employed for transmitting a torque from the torsion springs 84a and 84b to the turbine 22. The driven member 83 is an annular member, which is formed of a pressed metal and is arranged radially outside the turbine shell 30 of the turbine 22. The driven member 83 has an annular fixed portion 83a fixedly coupled to the turbine shell 30 and a plurality of claws 83b extending axially toward the engine from the outer periphery of the fixed portion 83a. The claws 83b of the driven member 83 are formed corresponding to the claws 82b of the drive member 82, and extend into spaces within curved portions of the claws 82b, respectively. The claw 83b has a circumferentially width similar to that of the claw 82b of the drive member 82, and is in contact with or close to the end, on the R1 side, of the torsion spring 84a and the end, on the R2 side, of the torsion spring 84b, similarly to the claw 82b.

The claw 83b is axially movable with respect to the drive member 82. More specifically, the piston 81 can axially move in accordance with change in hydraulic pressure while being engaged with the torsion springs 84a and 84b.

The claw 83b is located in a circumferentially intermediate position between the neighboring second portions 82e of the drive member 82, and is circumferentially spaced from the end of the second portion 82e by a predetermined angle. Before the claw 83b comes, in the rotating direction, into contact with the end of the second portion 82e, the driven member 83 can rotate relatively to the drive member 82. In other words, the second portion 82e of the drive member 82 and the claw 83b of the driven member 83 form a stop mechanism for stopping relative rotation. As described above, the claw 83b has a function of transmitting the torque owing to engagement with the torsion springs 84a and 84b, and forms a portion of the stop mechanism for the elastic coupling portion. Therefore, a special structure dedicated to the stop mechanism is not required.

When the speed ratio of the torque converter 1″ rises and the input shaft 3 reaches a constant rotation speed, the working fluid is discharged from the first hydraulic chamber A from the first portion 17. Consequently, the hydraulic pressure difference between the first and second hydraulic chambers A and B moves the piston 81 toward the front cover 11 so that the friction facing 86 is pressed against the flat friction surface of the front cover 11. Thereby, the torque of the front cover 11 is transmitted from the piston 81 to the driven member 83 via the torsion springs 84*a* and 84*b*. Further, the torque is transmitted from the driven member 83 to the turbine 22. More specifically, the front cover 11 is mechanically coupled to the turbine 22, and the torque of the front cover 11 is directly output to the input shaft 3 via the turbine 22.

In the engaged state of the lockup device described above, the lockup device 7″″ transmits the torque, and also operates to absorb and dampen the torsional vibrations transmitted from the front cover 11. More specifically, when the torsional vibrations are transmitted from the front cover 11 to the lockup device 7″″, the torsion springs 84*a* and 84*b* are compressed in the rotating direction between the piston 81 and driven plates 83. More specifically, the torsion springs 84*a* and 84*b* are compressed in the rotating direction between the claws 82*b* of the drive plate 82 and the claws 83*b* of the driven member 83. In this operation, the pair of torsion springs 84*a* and 84*b* compress and expand together in the rotating direction so that the torsional characteristics of a low rigidity and a large torsion angle can be achieved.

When the torsion springs 84*a* and 84*b* are repetitively compressed in accordance with the torsional vibrations supplied thereto, each torsion springs 84*a* and 84*b* is moved radially outward by the centrifugal force, and thereby slides on the spring holder 85. However, the spring holder 85 is configured to move in the rotating direction together with the torsion springs 84*a* and 84*b* so that the sliding resistance between them is extremely small. Accordingly, the performance for absorbing the torsional vibrations is sufficiently ensured.

The spring holder 85 has several advantageous effects. First, the spring holder 85 supports the radially outer side of the torsion springs 84*a* and 84*b* by its outer supporting portion 85*a*, during which the arc-shaped portion 82*c* of the drive member 82 restricts the radially outward movement thereof. Since the spring holder 85 restricts the radially outward movement of the torsion springs 84*a* and 84*b*, an outer cylindrical portion can be eliminated from the disk-like piston 81. Second, the spring holder 85 functions as an intermediate float member with respect to the pair of torsion springs 84*a* and 84*b*, and this simple structure allows elimination of the outer cylindrical portion of the piston. Third, the lockup device 7″″ can have a simple structure, requires a reduced number of parts and allows reduction in cost and weight. In particular, since the spring holder 85 has a simple structure, the weight can be small, and the steps of developing production equipment can be reduced. In particular, the drive member 82 has only the function of transmitting the torque, and does not have the function of holding the torsion springs so that the structure thereof can be simple, and the weight and thickness thereof can be reduced. Fourth, the spring holder 85 axially supports only the transmission side of the torsion springs 84*a* and 84*b* so that the torsion springs 84*a* and 84*b* are in direct contact with the piston 81. As a result, the torsion springs 84*a* and 84*b* can have a sufficiently large coil diameter, and design for achieving the low rigidity can be easily performed. Fifth, the spring holder 85, torsion springs 84*a* and 84*b* and driven member 83 can be disposed within a space, which is formed between the radially outer portion of the piston 81 and the radially outer portion of the turbine 22, and is usually unnecessary, so that a good space efficiency can be achieved. Thus, these members do not remarkably increase the axial size and others of the torque converter.

The lockup device 7″″ can have a structure other than that of the foregoing embodiment. For example, the invention can be applied to a lockup device employing a multiple disk clutch, in which several disks or plates are arranged between a piston and a front cover.

According to the lockup device 7″″ of this embodiment of the present invention, since the support member restricts the outward movement of the elastic element, the outer cylindrical portion can be eliminated from the disk-like piston.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An elastic coupling mechanism comprising:
    a first elastic member having first and second rotationally facing ends;
    a second elastic member having first and second rotationally facing ends, said second elastic member disposed radially inward from said first elastic member:
    a first rotating member having first abutting parts that abut against said first and second rotationally facing ends of said first elastic member;
    a second rotating member having second abutting parts that abut against said first and second rotationally facing ends of said second elastic member, said second rotating member being configured to support a first axial side of said first and second elastic members; and
    an intermediate member connecting said first and second elastic members together in a rotating direction such that said first and second elastic members compress together so as to act as if said first and second elastic members were arranged end to end in the rotating direction, said intermediate member being supported by said second rotating member and engaged with said second rotating member so as to move in the rotating direction, said intermediate member supporting a second axial side of said first and second elastic members, said second axial side being axially opposite said first axial side.

2. The elastic coupling mechanism as recited in claim 1, wherein
    said intermediate member includes third abutting parts that abut against said first and second rotationally facing ends of said first elastic member; fourth abutting parts that abut against said first and second rotationally facing ends of said second elastic member; and a connecting part that connects said third abutting parts and said fourth abutting parts.

3. The elastic coupling mechanism as recited in claim 2, wherein
said intermediate member further includes an intermediate support part that extends radially between said first elastic member and said second elastic member.

4. The elastic coupling mechanism as recited in claim 3, wherein
said connecting part includes a first support part that supports a radially facing outside portion of said first elastic member and a second support part that supports a radially facing outside portion of said second elastic member.

5. The elastic coupling mechanism as recited in claim 1, wherein
said intermediate member includes a first window part that houses said first elastic member and a second window part that houses said second elastic member.

6. The elastic coupling mechanism as recited in claim 1, further comprising
said first elastic members including a plurality of said first elastic elements aligned in a first circumferential direction;
said second elastic members including a plurality of said second elastic elements aligned in a second circumferential direction;
said first abutting parts of said first rotating member abut against both rotationally facing ends of said first elastic elements;
said second abutting parts of said second rotating member abut against both rotationally facing ends of said second elastic elements; and
said intermediate member being disc-shaped with a plurality of window parts that house said first and second elastic elements and connects said first and second elastic elements such that radially adjacent pairs of said first and second elastic elements compress together so as to act as if said first and second elastic elements were arranged end to end in the rotating direction.

7. The elastic coupling mechanism as recited in claim 6, wherein
said intermediate member includes third abutting parts that abut against said rotationally facing ends of said first elastic elements; fourth abutting parts that abut against said rotationally facing ends of said second elastic elements; and a connecting part that connects said third abutting parts and said fourth abutting parts.

8. The elastic coupling mechanism as recited in claim 7, wherein
said intermediate member further includes an intermediate support part that extends radially between said first elastic elements and said second elastic elements.

9. The elastic coupling mechanism as recited in claim 8, wherein
said connecting part includes first support parts that support radially facing outside portions of said first elastic elements and second support parts that support radially facing outside portions of said second elastic elements.

10. The elastic coupling mechanism as recited in claim 6, wherein
said intermediate member includes first window parts that house said first elastic elements and second window parts that houses said second elastic elements.

11. The elastic coupling mechanism as recited in claim 1, wherein said first abutting part of said first rotating member is in contact with said first elastic member such that the first abutting part is removable from said first elastic member in an axial direction.

12. A torque converter adapted to be used to transmit torque from a power input shaft to an output shaft, said torque converter comprising:
a front cover adapted to be coupled to the power input shaft, said front cover being provided at an inner side with a friction surface;
an impeller connected to said front cover to form a hydraulic chamber together with said front cover;
a turbine disposed opposite said impeller and disposed inside said hydraulic chamber, said turbine being adapted to be coupled to the output shaft, said front cover and said turbine forming a space therebetween;
a stator disposed between said impeller and said turbine;
a lockup device including a piston arranged to axially move within said space in accordance with pressure changes in said space, said piston having a first frictional coupling portion adjacent to said friction surface of said front cover; and
an elastic coupling mechanism operatively coupled between said turbine and said piston to supply a torque to said turbine, said elastic coupling mechanism comprising:
a first elastic member having first and second rotationally facing ends;
a second elastic member having first and second rotationally facing ends,
said second elastic member disposed radially inward from said first elastic member, said second rotating member being configured to support a first axial side of said first and second elastic members;
a first rotating member having first abutting parts that abut against said first and second rotationally facing ends of said first elastic member;
a second rotating member having second abutting parts that abut against said first and second rotationally facing ends of said second elastic member; and
an intermediate member connecting said first and second elastic members together in a rotating direction such that said first and second elastic members compress together so as to act as if said first and second elastic members were arranged end to end in the rotating direction, said intermediate member being supported by said second rotating member and engaged with said second rotating member so as to move in the rotating direction, said intermediate member supporting a second axial side of said first and second elastic members, said second axial side being axially opposite said first axial side.

13. The torque converter as recited in claim 12, wherein
said intermediate member includes third abutting parts that abut against said first and second rotationally facing ends of said first elastic member; fourth abutting parts that abut against said first and second rotationally facing ends of said second elastic member; and a connecting part that connects said third abutting parts and said fourth abutting parts.

14. The torque converter as recited in claim 13, wherein
said intermediate member further includes an intermediate support part that extends radially between said first elastic member and said second elastic member.

15. The torque converter as recited in claim 14, wherein
said connecting part includes a first support part that supports a radially facing outside portion of said first elastic member and a second support part that supports a radially facing outside portion of said second elastic member.

16. The torque converter as recited in claim 12, wherein
said intermediate member includes a first window part that houses said first elastic member and a second window part that houses said second elastic member.

17. The torque converter as recited in claim 12, further comprising
said first elastic members including a plurality of said first elastic elements aligned in a first circumferential direction;
said second elastic members including a plurality of said second elastic elements aligned in a second circumferential direction;
said first abutting parts of said first rotating member abut against both rotationally facing ends of said first elastic elements;
said second abutting parts of said second rotating member abut against both rotationally facing ends of said second elastic elements; and
said intermediate member being disc-shaped with a plurality of window parts that house said first and second elastic elements and connects said first and second elastic elements such that radially adjacent pairs of said first and second elastic elements compress together so as to act as if said first and second elastic elements were arranged end to end in the rotating direction.

18. The torque converter as recited in claim 17, wherein
said intermediate member includes third abutting parts that abut against said rotationally facing ends of said first elastic elements; fourth abutting parts that abut against said rotationally facing ends of said second elastic elements; and a connecting part that connects said third abutting parts and said fourth abutting parts.

19. The torque converter as recited in claim 18, wherein
said intermediate member further includes an intermediate support part that extends radially between said first elastic elements and said second elastic elements.

20. The torque converter as recited in claim 19, wherein
said connecting part includes first support parts that support radially facing outside portions of said first elastic elements and second support parts that support radially facing outside portions of said second elastic elements.

21. The torque converter as recited in claim 17, wherein
said intermediate member includes first window parts that house said first elastic elements and second window parts that houses said second elastic elements.

22. The torque converter as recited in claim 12, wherein said first abutting part of said first rotating member is in contact with said first elastic member such that the first abutting part is removable from said first elastic member in an axial direction.

23. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:
an output rotary member;
a piston being configured to move within the space in accordance with pressure changes in the space and to perform a clutch operation, said piston being engageable with the front cover;
an elastic member disposed on a side of said piston opposite the front cover, said elastic member being arranged to elastically couple said piston and said output rotary member in a rotating direction;
a support member having a continuously cylindrical outer support portion arranged radially outside said elastic member, said support member being arranged to rotate with respect to said piston and said output rotary member; and
a restricting portion arranged to restrict radial movement of said support member.

24. The lockup device as recited in claim 23, wherein
said support member further includes an inner support portion arranged on a radially inner side of said elastic member, with said restricting portion contacting said inner support portion to radially support said support member.

25. The lockup device as recited in claim 24, wherein
said restricting portion has an outer peripheral surface in contact with an inner peripheral surface of said inner support portion.

26. The lockup device as recited in claim 23, wherein
said support member further includes a cylindrical axial support portion extending radially inward from said outer support portion to support an axially side of said elastic member with said restricting portion contacting said axial support portion to radially support said support member.

27. The lockup device as recited in claim 23, wherein
said elastic member includes a pair of elastic elements serially arranged to compress together in the rotating direction, and
said support member further includes a torque transmitting portion arranged in a space between adjacent rotationally facing ends of said pair of said elastic elements.

28. The lockup device as recited in claim 24, wherein
said elastic member includes a pair of elastic elements serially arranged to compress together in the rotating direction, and
said support member further includes a torque transmitting portion arranged in a space between adjacent rotationally facing ends of said pair of said elastic elements.

29. The lockup device as recited in claim 25, wherein
said elastic member includes a pair of elastic elements serially arranged to compress together in the rotating direction, and
said support member further includes a torque transmitting portion arranged in a space between adjacent rotationally facing ends of said pair of said elastic elements.

30. The lockup device as recited in claim 26, wherein
said elastic member includes a pair of elastic elements serially arranged to compress together in the rotating direction, and
said support member further includes a torque transmitting portion arranged in a space between adjacent rotationally facing ends of said pair of said elastic elements.

31. The lockup device as recited in claim 23, wherein said support member is a plate.

32. The lockup device as recited in claim 31, wherein said support member has a disk-shaped portion to support an axial side of said elastic member and said outer support portion extending from a radially outer periphery of said disk-shaped portion toward said turbine in the axial direction.

33. The lockup device as recited in claim 23, wherein, said output member is fixed to the turbine and has claws to support rotationally facing ends of said elastic member, said lockup device further comprises a stopper to stop relative rotation of said piston and said driven member by abutting said claws as said elastic member is compressed.

34. The lockup device as recited in claim 33, wherein, said support member supports said elastic member from a side opposite the piston in an axial direction.

35. The lockup device as recited in claim 34, wherein, said support member is one plate.

36. The lockup device as recited in claim 34, wherein, said support member has a disk-shaped portion to support an axial side of said elastic members and an outer support portion extending from a radially outer periphery of said disk-shaped portion toward the front cover in the axial direction.

37. The lockup device as recited in claim 34, wherein, said support member is supported by said piston so as not to move axially.

38. The lockup device in a torque converter as recited in claim 34, said elastic member comprises a pair of members arranged to operate in series in the rotating further includes a torque transmitting portion arranged in a rotational space between said pair of members.

39. A torque converter adapted to be used to transmit torque from a power input shaft to an output shaft, said torque converter comprising:

a front cover being configured to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine;

a lockup device disposed in said space to mechanically engage and disengage said front cover with respect to said turbine, said lockup device including an output rotary member;

a piston arranged to axially move within said space in accordance with pressure changes in said space and to perform a clutch operation, said piston being engageable with said front cover;

an elastic member disposed on the side of said piston opposite said front cover, said elastic member being arranged to elastically couple said piston and said output rotary member in a rotating direction;

a support member having a continuously cylindrical outer support portion arranged radially outside said elastic member, said support member being arranged to rotate with respect to said piston and said output rotary member; and a restricting portion arranged to restrict radial movement of said support member.

40. The torque converter as recited in claim 39, wherein said support member further includes an inner support portion arranged on a radially inner side of said elastic member, with said restricting portion contacting said inner support portion to radially support said support member.

41. The torque converter as recited in claim 40, wherein said restricting portion has an outer peripheral surface in contact with an inner peripheral surface of said inner support portion.

42. The torque converter as recited in claim 31, wherein said support member further includes a cylindrical axial support portion extending radially inward from said outer support portion to support an axially side of said elastic member with said restricting portion contacting said axial support portion to radially support said support member.

43. The torque converter as recited in claim 39, wherein said elastic member includes a pair of elastic elements serially arranged to compress together in the rotating direction, and said support member further includes a torque transmitting portion arranged in a space between adjacent rotationally facing ends of said pair of said elastic elements.

44. The torque converter as recited in claim 40, wherein said elastic member includes a pair of elastic elements serially arranged to compress together in the rotating direction, and said support member further includes a torque transmitting portion arranged in a space between adjacent rotationally facing ends of said pair of said elastic elements.

45. The torque converter as recited in claim 41, wherein said elastic member includes a pair of elastic elements serially arranged to compress together in the rotating direction, and said support member further includes a torque transmitting portion arranged in a space between adjacent rotationally facing ends of said pair of said elastic elements.

46. The torque converter as recited in claim 42, wherein said elastic member includes a pair of elastic elements serially arranged to compress together in the rotating direction, and said support member further includes a torque transmitting portion arranged in a space between adjacent rotationally facing ends of said pair of said elastic elements.

47. The lockup device as recited in claim 39, wherein said support member is a plate.

48. The lockup device as recited in claim 47, wherein said support member has a disk-shaped portion to support an axial side of said elastic member and said outer support portion extending from a radially outer periphery of said disk-shaped portion toward said turbine in the axial direction.

49. The torque converter as recited in claim 39, wherein, said output member is fixed to said turbine and has claws to support rotationally facing ends of said elastic member, said lockup device further comprising a stopper to stop relative rotation of said piston and said driven member by abutting with said claws as said elastic member is compressed.

50. The torque converter as recited in claim 39, wherein, said support member supports said elastic member from the side opposite to said piston in an axial direction.

51. The torque converter as recited in claim 50, wherein, said support member is one plate.

52. The torque converter as recited in claim 50, wherein, said support member has a disk-shaped portion to support an axial side of said elastic members and an outer support portion extending from a radially outer periphery of said disk-shaped portion toward said front cover in the axial direction.

53. The torque converter as recited claim 50, wherein, said support member is supported by said piston so as not to move axially.

54. The torque converter in a torque claim 50, said elastic member comprises a pair of members arranged to operate in series in the rotating direction, and said support member further includes a torque transmitting portion arranged in a rotational space between said pair of members.

55. An elastic coupling mechanism comprising:
    a first elastic member having first and second rotationally facing ends;
    a second elastic member having first and second rotationally facing ends, said second elastic member disposed radially inward from said first elastic member;
    a first rotating member having first abutting parts being configured to abut against said first and second rotationally facing ends of said first elastic member;
    a second rotating member having second abutting parts being configured to abut against said first and second rotationally facing ends of said second elastic member; and
    an intermediate member connecting said first and second elastic members together in a rotating direction such that said first and second elastic members compress together so as to act as if said first and second elastic members were arranged end to end in the rotating direction, said intermediate member being a plate.

56. A torque converter adapted to be used to transmit torque from a power input shaft to an output shaft, said torque converter comprising:
    a front cover adapted to be coupled to the power input shaft, said front cover being provided at an inner side with a friction surface;
    an impeller connected to said front cover to form a hydraulic chamber together with said front cover;
    a turbine disposed opposite said impeller and disposed inside said hydraulic chamber, said turbine being adapted to be coupled to the output shaft, said front cover and said turbine forming a space therebetween;
    a stator disposed between said impeller and said turbine;
    a lockup device including a piston arranged to move axially within said space in accordance with pressure changes in said space, said piston having a first frictional coupling portion adjacent to said friction surface of said front cover; and
    an elastic coupling mechanism operatively coupled between said turbine and said piston to supply a torque to said turbine, said elastic coupling mechanism comprising,
        a first elastic member having first and second rotationally facing ends,
        a second elastic member having first and second rotationally facing ends, said second elastic member disposed radially inward from said first elastic member,
        a first rotating member having first abutting parts that abut against said first and second rotationally facing ends of said first elastic member,
        a second rotating member having second abutting parts that abut against said first and second rotationally facing ends of said second elastic member, and
        an intermediate member connecting said first and second elastic members together in a rotating direction such that said first and second elastic members compress together so as to act as if said first and second elastic members were arranged end to end in the rotating direction, said intermediate member being a plate.

57. An elastic coupling mechanism comprising:
    a first elastic member having first and second rotationally facing ends;
    a second elastic member having first and second rotationally facing ends, said second elastic member disposed radially inward from said first elastic member;
    a first rotating member having first abutting parts that abut against said first and second rotationally facing ends of said first elastic member;
    a second rotating member having second abutting parts that abut against said first and second rotationally facing ends of said second elastic member; and
    an intermediate member connecting said first and second elastic members together in a rotating direction such that said first and second elastic members compress together so as to act as if said first and second elastic members were arranged end to end in the rotating direction.

58. The elastic coupling mechanism as recited in claim 57, wherein
    said second rotating member curves along said radially outer portion of said turbine shell,
    said first and second elastic members are disposed along said second rotating member and said turbine shell, and axial position of said first elastic member is closer to said turbine in the axial direction than axial position of said second elastic member.

59. The elastic coupling mechanism as recited in claim 58, wherein
    said first abutting part of said first rotating member is in contact with said first elastic members such that the first abutting part can be removed from said first elastic member in an axial direction.

60. The elastic coupling mechanism as recited in claim 58, wherein said intermediate member is a plate.

61. The elastic coupling mechanism as recited in claim 57, wherein
    an axial side of said first and second elastic members are supported by said second member,
    said intermediate member is supported by said second rotating member and engaged with said second rotating member so as to move in the rotating direction, said intermediate member supporting the other axial side of said first and second elastic members.

62. The elastic coupling mechanism as recited in claim 61, wherein said intermediate member is a plate.

63. The elastic coupling mechanism as recited in claim 57, wherein said intermediate member is a plate.

64. A torque converter adapted to be used to transmit torque from a power input shaft to an output shaft, said torque converter comprising:
    a front cover being configured to be coupled to the power input shaft, said front cover being provided at an inner side with a friction surface;

an impeller being connected to said front cover to form a hydraulic chamber with said front cover;

a turbine disposed opposite said impeller and disposed inside said hydraulic chamber, said turbine being configured to be coupled to the output shaft, said front cover and said turbine forming a space therebetween;

a stator disposed between said impeller and said turbine;

a lockup device including a piston arranged to move axially within said space in accordance with pressure changes in said space, said piston having a first frictional coupling portion adjacent to said friction surface of said front cover; and an elastic coupling mechanism operatively coupled between said turbine and said piston to supply a torque to said turbine, said elastic coupling mechanism comprising, a first elastic member having first and second rotationally facing ends, a second elastic member having first and second rotationally facing ends, said second elastic member disposed radially inward from said first elastic member, a first rotating member having first abutting parts that abut against said first and second rotationally facing ends of said first elastic member, said first rotating member being said piston, a second rotating member having second abutting parts that abut against said first and second rotationally facing ends of said second elastic member, said second rotating member being fixed on radially outer portion of a turbine shell of said turbine, and an intermediate member connecting said first and second elastic members together in a rotating direction such that said first and second elastic members compress together so as to act as if said first and second elastic members were arranged end to end in the rotating direction.

65. The torque converter as recited in claim 64, wherein said second rotating member curves along a radially outer portion of said turbine shell, said first and second elastic members are disposed along said second rotating member and said turbine shell, and an axial position of said first elastic member is closer to said turbine in the axial direction than an axial position of said second elastic member.

66. The torque converter as recited in claim 65, wherein said first abutting part of said first rotating member is in contact with said first elastic members such that said first abutting part is removable from said first elastic member in an axial direction.

67. The torque converter as recited in claim 65, wherein said intermediate member is a plate.

68. The torque converter as recited in claim 64, wherein a first axial side of said first and second elastic members are supported by said second rotating member, said intermediate member is supported by said second rotating member and engaged with said second rotating member so as to move in the rotating direction, said intermediate member supporting a second axial side of said first and second elastic members, said first and second axial sides being different.

69. The torque converter as recited in claim 68, wherein said intermediate member is a plate.

70. The torque converter as recited in claim 64, wherein said intermediate member is a plate.

* * * * *